(12) United States Patent
Ishikawa et al.

(10) Patent No.: US 9,507,216 B2
(45) Date of Patent: Nov. 29, 2016

(54) LIQUID CRYSTAL DISPLAY DEVICE

(71) Applicant: MITSUBISHI ELECTRIC CORPORATION, Tokyo (JP)

(72) Inventors: Yoshimitsu Ishikawa, Tokyo (JP); Shingo Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 154 days.

(21) Appl. No.: 14/177,135

(22) Filed: Feb. 10, 2014

(65) Prior Publication Data
US 2014/0226113 A1  Aug. 14, 2014

(30) Foreign Application Priority Data
Feb. 13, 2013  (JP) .................... 2013-025158

(51) Int. Cl.
*G02F 1/1335*  (2006.01)
*G02F 1/1343*  (2006.01)
*G02F 1/1345*  (2006.01)

(52) U.S. Cl.
CPC ... *G02F 1/134309* (2013.01); *G02F 1/133512* (2013.01); *G02F 2001/134354* (2013.01)

(58) Field of Classification Search
CPC .......... G02B 27/225; H04N 13/0436; H04N 13/0445; G02F 2001/134345; G02F 1/134336; G02F 1/1323
See application file for complete search history.

(56) References Cited

U.S. PATENT DOCUMENTS

| 7,907,223 B2 | 3/2011 | Maeda |
| 7,982,728 B2 | 7/2011 | Hamagishi |
| 8,144,079 B2 | 3/2012 | Mather et al. |
| 2002/0105614 A1* | 8/2002 | Nakayama ........ G02F 1/136213 349/143 |
| 2006/0170834 A1* | 8/2006 | Kim .................... G02B 27/2264 349/15 |
| 2009/0096811 A1 | 4/2009 | Tanaka et al. |
| 2011/0242466 A1 | 10/2011 | Hamagishi |

FOREIGN PATENT DOCUMENTS

| JP | 2007-264082 A | 10/2007 |
| JP | 2008-064917 A | 3/2008 |
| JP | 2008-527440 A | 7/2008 |
| WO | 20061080540 A1 | 8/2006 |
| WO | 20071001071 A1 | 1/2007 |

* cited by examiner

*Primary Examiner* — Jessica M Merlin
(74) *Attorney, Agent, or Firm* — Studebaker & Brackett PC

(57) ABSTRACT

Only a first pixel electrode exists just under a first light shielding part of a black matrix, a gate insulating film and an interlayer insulating film exist on the upper layer of the first pixel electrode, and this area is an end area. Just under an opening of the black matrix, a second pixel electrode exists on the uppermost layer of a TFT substrate. The second pixel electrode is formed on the gate insulating film and the interlayer insulating film except a contact part. An area where the second pixel electrode exists on the uppermost layer of the TFT substrate is a main area. By a combination structure of the first pixel electrode and the second pixel electrode, the transmittance of the liquid crystal layer in the end area is made relatively higher than the transmittance in the main area.

13 Claims, 16 Drawing Sheets

F I G . 2
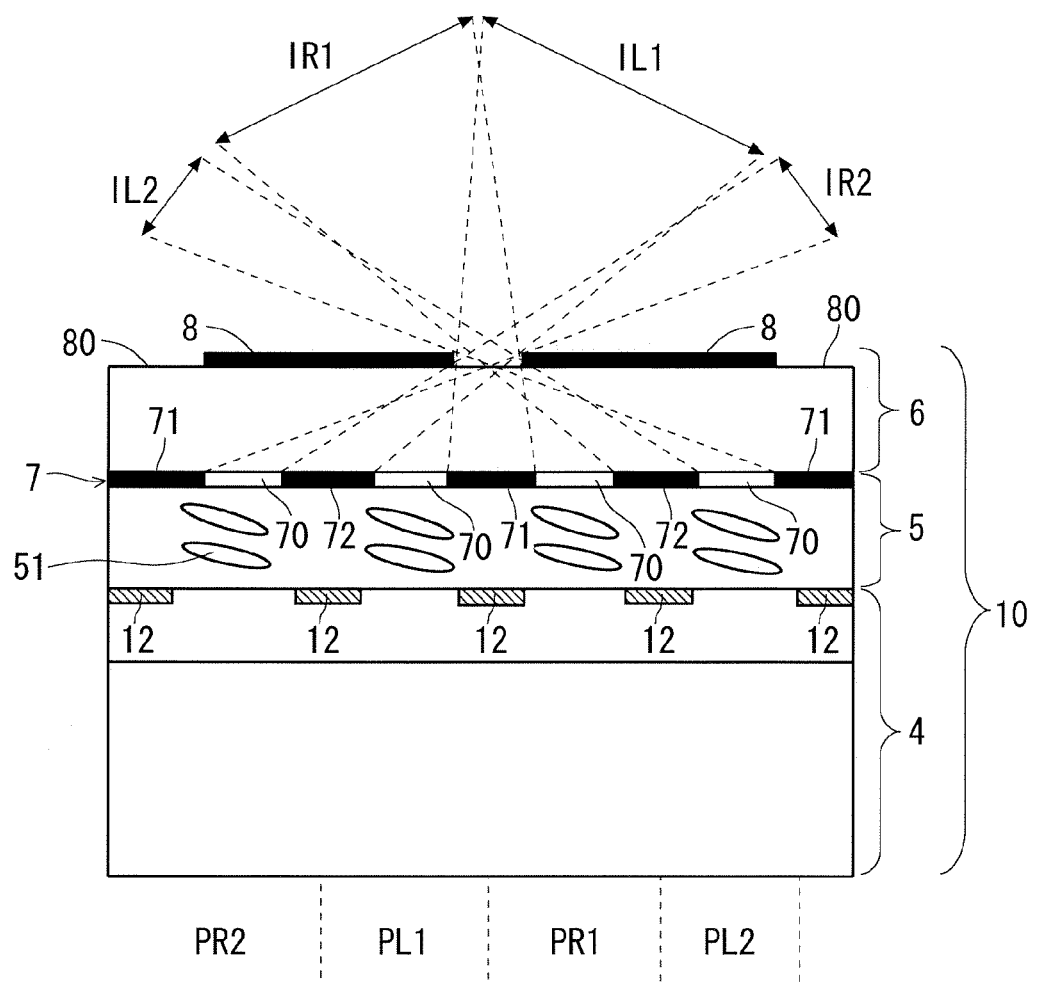

F I G. 3
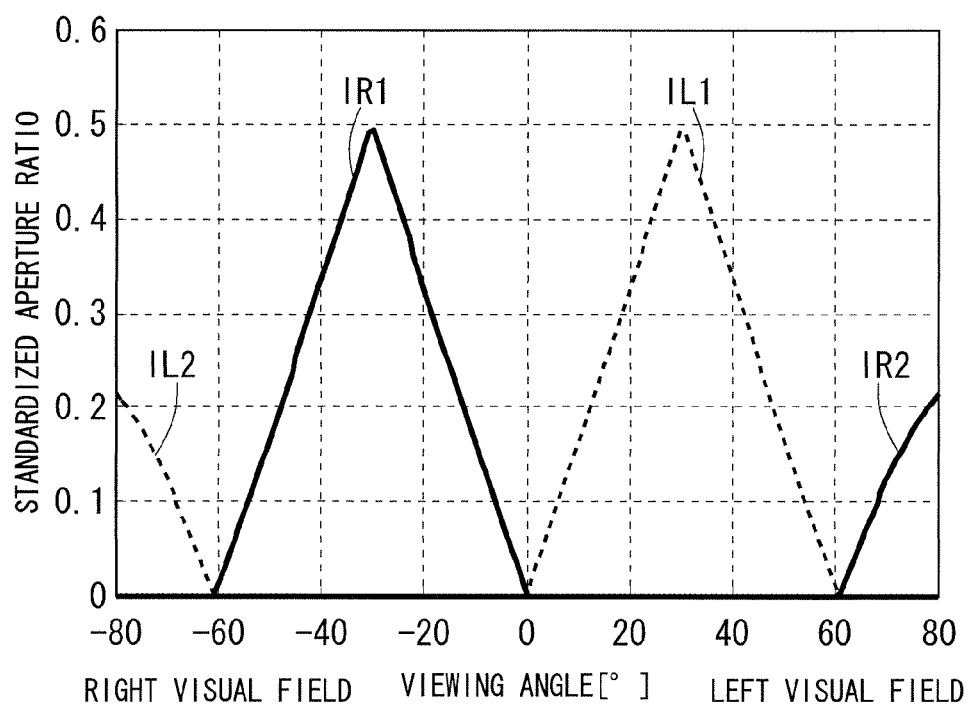

F I G. 5
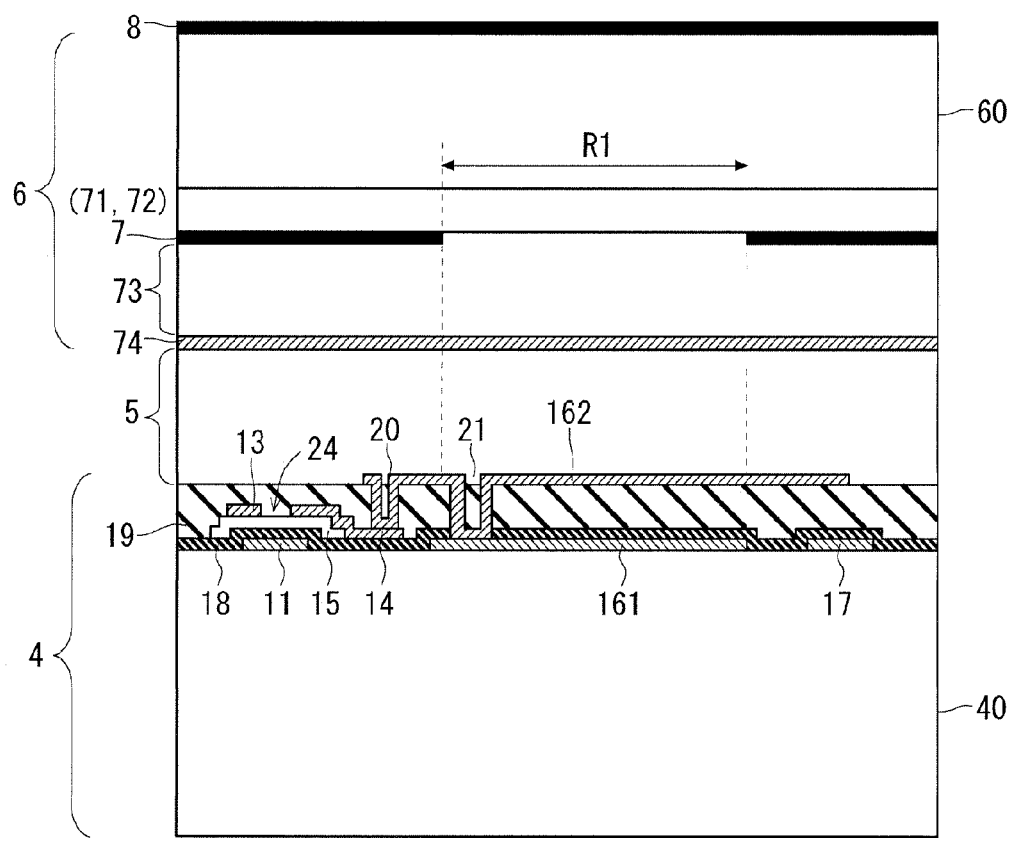

F I G . 6
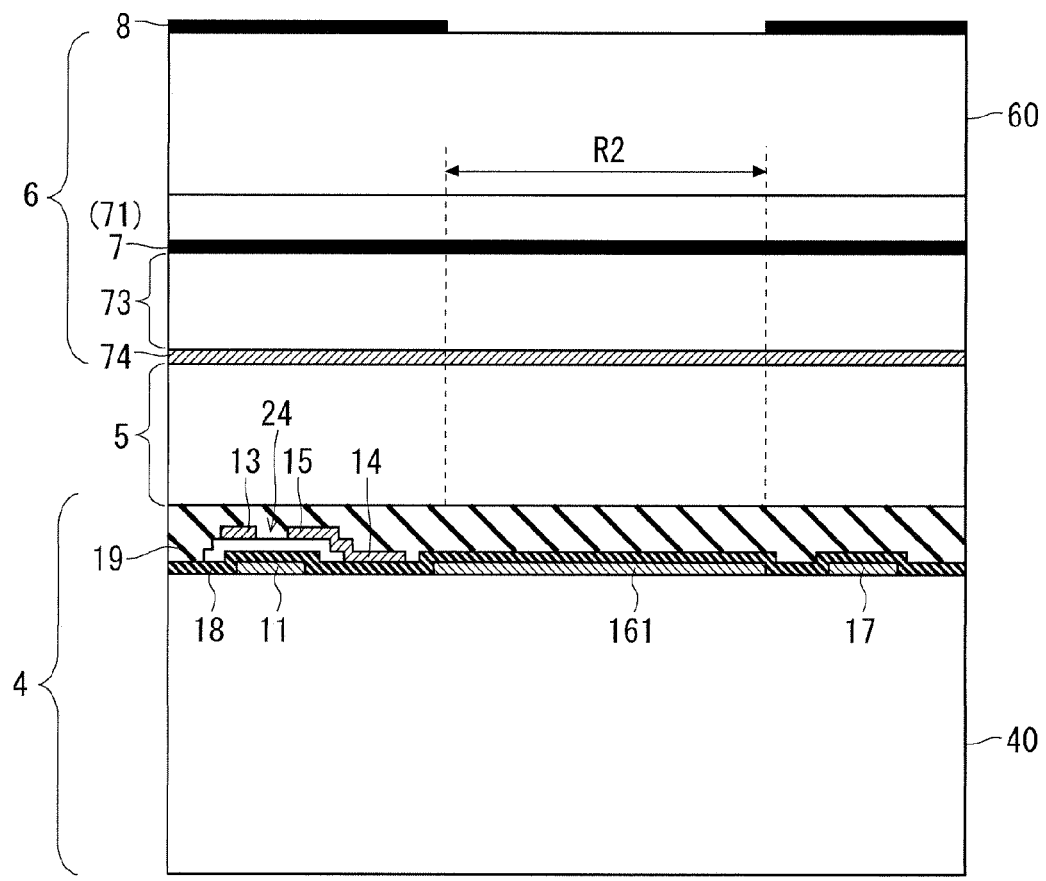

F I G . 1 0
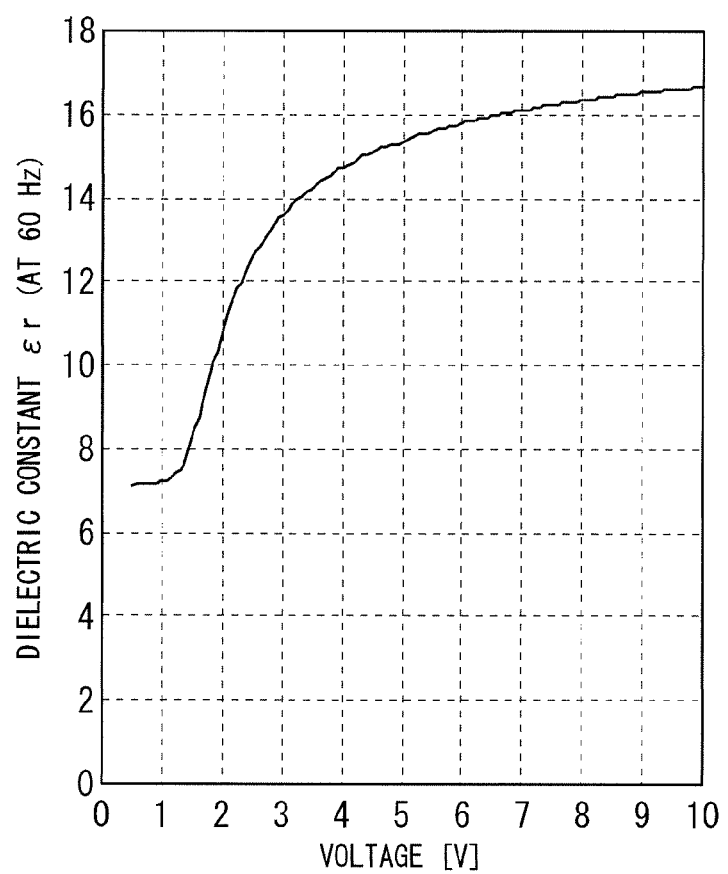

F I G . 1 2
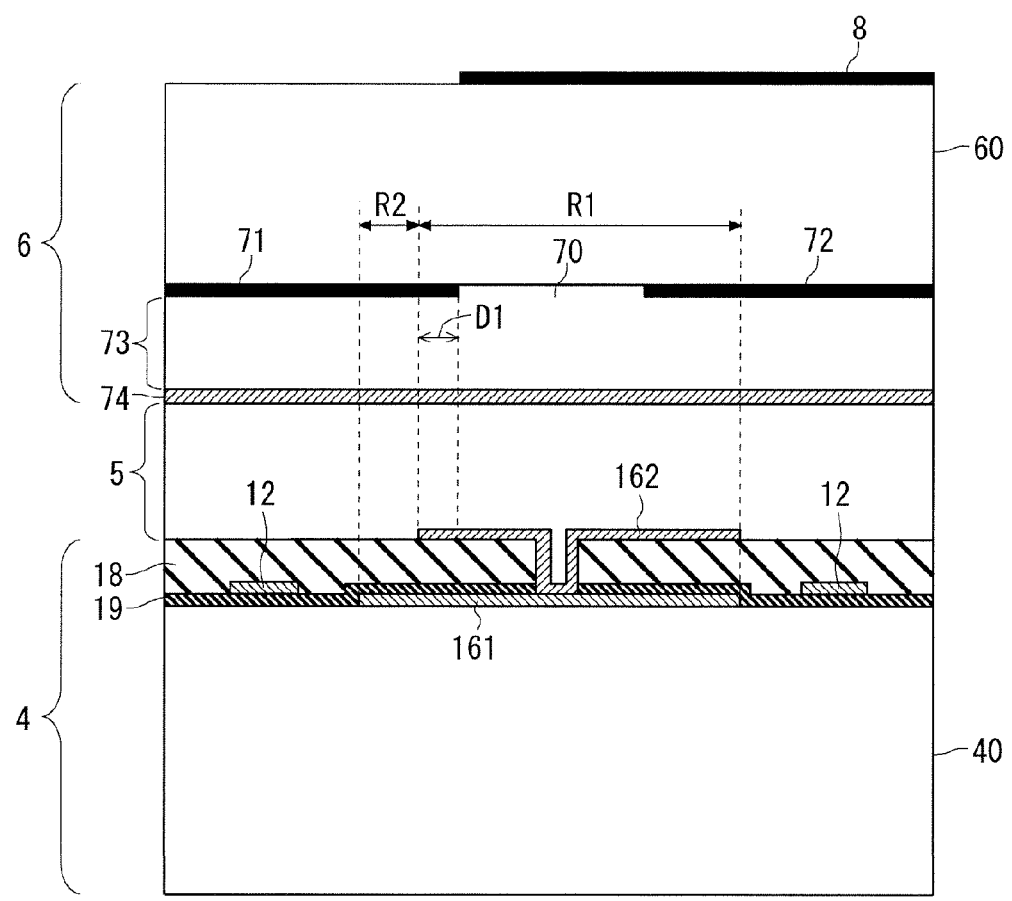

F I G . 1 3
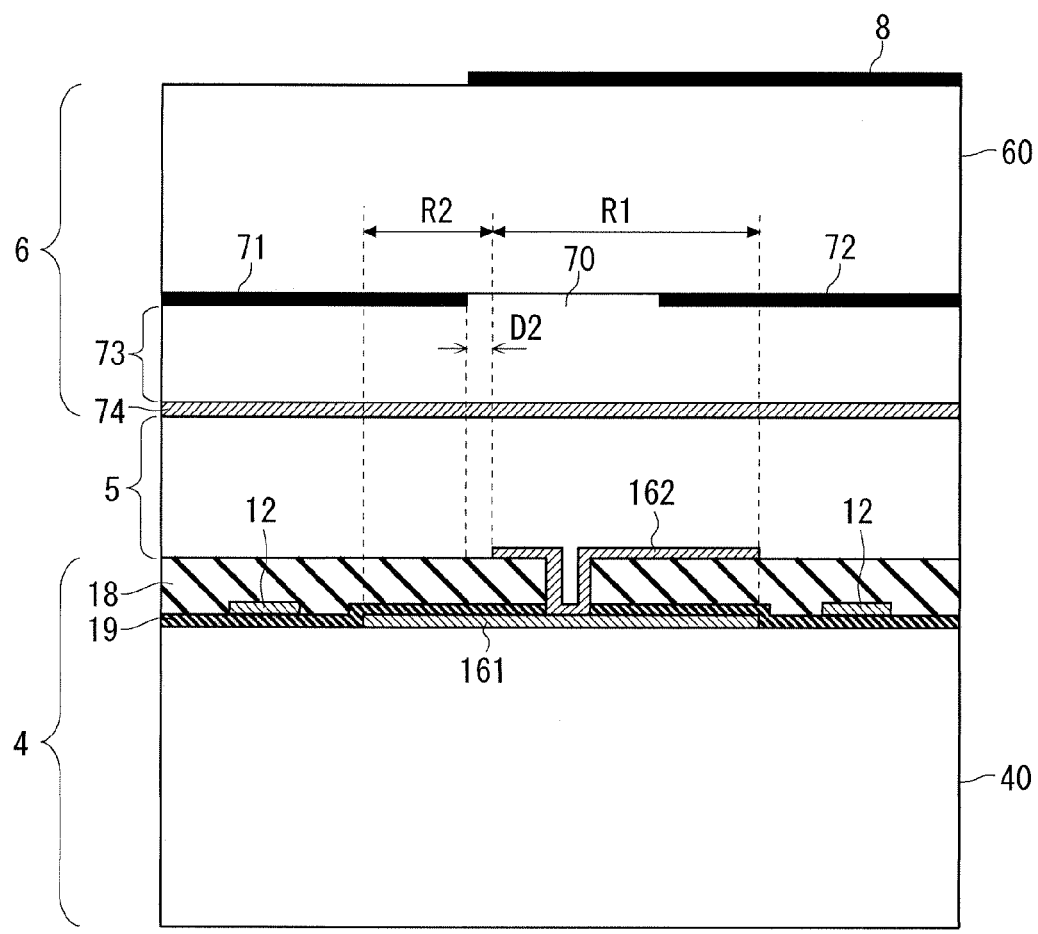

F I G . 1 5
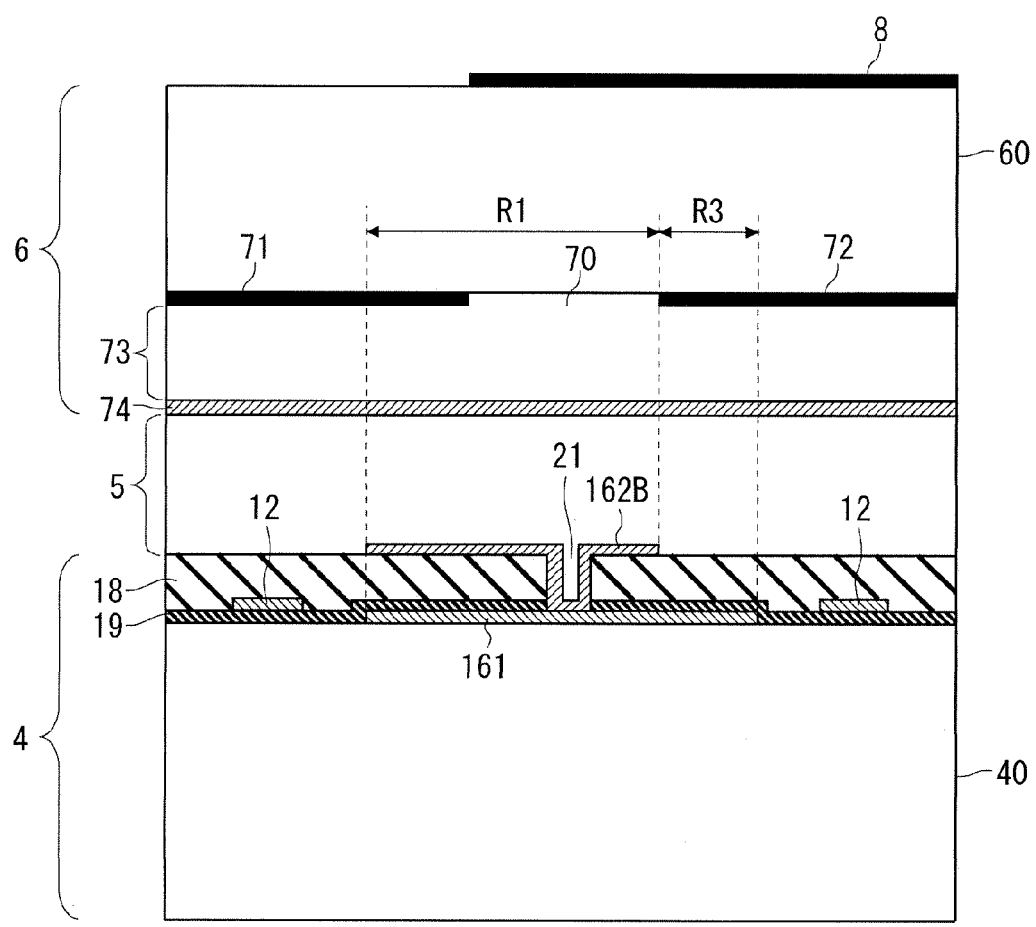

F I G . 1 7
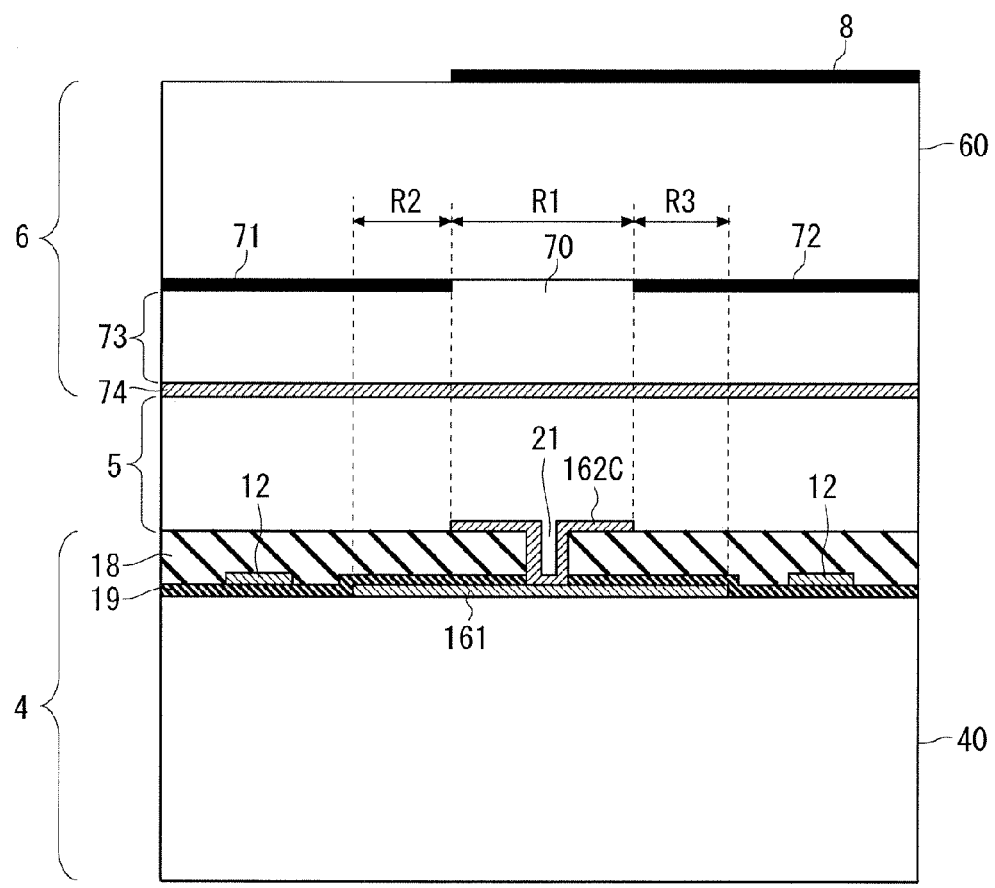

LIQUID CRYSTAL DISPLAY DEVICE

BACKGROUND OF THE INVENTION

Field of the Invention

The present invention relates to a liquid crystal display device, and more particularly to a multiple view liquid crystal display device that is capable of displaying a plurality of images in respective different directions, and the like.

Description of the Background Art

Liquid crystal display devices are used as the monitors of personal computers (PCs) and portable information terminal devices, or the display devices of TVs and the like, by utilizing advantages such as low power consumption, and small size and light weight. The liquid crystal display device is a device that includes a plurality of pixels that are arranged in a matrix, and optically modulates each of the pixels to display an image.

As the liquid crystal display device, an active matrix type liquid crystal display device that includes thin film transistors (TFTs) arranged in a matrix as switching elements is widely used.

Recently, there is developed a multiple view liquid crystal display device (plural screen liquid crystal display device) that is capable of displaying a plurality of images at different directional viewing angle by using a single liquid crystal display panel (liquid crystal panel). For example, Japanese Translation of PCT Application No. 2008-527440, Japanese Patent Application Laid-Open Nos. 2007-264082 and 2008-064917 each disclose a parallax barrier system multiple view liquid crystal display device, particularly, a double screen liquid crystal display device that displays different images (an image for right and an image for left) as viewed from right and left with respect to the front of the screen. Additionally, PCT International Publication No. WO2007/001071 discloses a vehicular double screen liquid crystal display device.

The parallax barrier system multiple view liquid crystal display device includes a liquid crystal panel, in which a plurality of types of pixels that display a plurality of images are mixed and arranged in accordance with a predetermined rule, and a light shielding layer called a parallax barrier, which is disposed on the front surface side (viewing side, display surface side) of the liquid crystal panel. The parallax barrier is arranged so as to shield light traveling in a specified direction from each pixel of the liquid crystal panel. Consequently, the light from the liquid crystal panel is separated in a plurality of directions, and the plurality of images displayed by the liquid crystal panel are displayed in respective different directions.

In the parallax barrier system multiple view liquid crystal display device has a problem of "crosstalk" that, into a first type image displayed in a certain direction, a part of a second type image that is different from the first type image and displayed in other direction is leaked, and is observed.

For example, in a case where crosstalk occurs in a parallax barrier system double screen liquid crystal display device that displays by dividing two images right and left, an image (image for left) to be displayed when a screen is viewed from the left with respect to the front, and an image (image for right) to be displayed when the screen is viewed from the right are viewed so as to overlap. This crosstalk occurs when the ranges of the viewing angles of the respective images overlap, and therefore is likely to occur in the vicinity of a boundary between viewing angle ranges of the plurality of images. That is, in the double screen liquid crystal display device, the crosstalk is likely to occur when the screen is viewed from the front of the screen, which is a boundary between a viewing angle range of the image for right and a viewing angle range of the image for left. Particularly, when an image that includes a lot of black display is displayed, even slight leak from other image causes easy visual recognition, and therefore an influence on an image quality is increased.

Generally, the liquid crystal panel includes a first substrate, on which pixel electrodes, switching elements that supply image signals to the pixel electrodes, signal lines, and the like are disposed, a second substrate, on which a black matrix that defines respective areas of pixels (pixel display areas), and a color filter (CF) are disposed, and liquid crystals that are sandwiched between these substrates. In the parallax barrier system double screen liquid crystal display device, a black matrix that defines a display pixel area is formed on a surface, opposed to a first substrate, of a second substrate, and a parallax barrier is formed on a surface opposite to the surface (viewing side). Accordingly, a gap corresponding to the thickness of the second substrate exists between the parallax barrier and the black matrix. The size of this gap is a factor for determining the direction and the width of the viewing angle range of each of the plurality of images that are displayed at the same time, along with the size of openings of the parallax barrier and the pitch of the pixels.

In the parallax barrier system multiple view liquid crystal display device, a phenomenon called "reverse viewing" that an image to be displayed in a reversed direction is viewed when the screen is viewed from a direction greatly deviated from the front is caused due to the gap between the parallax barrier and the black matrix. For example, when an observer moves to the right from the front of the screen with respect to the double screen liquid crystal display device, the image for right is first viewed. However, when the observer further continues to move to the right, a range in which the image for left is viewed appears. This is because other pixels adjacent to pixels to be originally viewed are viewed through the opening of the parallax barrier.

That is, in the parallax barrier system double screen liquid crystal display device, the viewing angle range of the image for left due to the reverse viewing phenomenon exists outside the viewing angle range of the image for right, and the viewing angle range of the image for right due to the reverse viewing phenomenon exists outside the viewing angle range of the image for left. Therefore, the crosstalk of the image for right and the image for left is likely to occur not only in the vicinity of the front of the screen, but also in the vicinity of the outer end (maximum viewing angle) of the viewing angle range of each of the image for right and the image for left, actually. Hereinafter, the crosstalk that occurs in the vicinity of the front of a screen is referred to as "front crosstalk", and crosstalk resulting from the reverse viewing phenomenon that occurs in the vicinity of the outer end (maximum viewing angle) of the viewing angle range of each of images is referred to as "reverse viewing crosstalk".

The front crosstalk and the reverse viewing crosstalk become problems also in not only the double screen liquid crystal display device, but also an arbitrary parallax barrier system multiple view liquid crystal display device.

A rate of crosstalk (intensity) that occurs in the multiple view liquid crystal display device can be expressed by the following Formula (1).

$$\text{Crosstalk rate} = (WBB - BBB)/(\min\{WBB, BBB\}) \quad (1)$$

In Formula (1), WBB means (black luminance in white-black display), and BBB means (black luminance in black-black display).

That is, in Formula (1), WBB and BBB mean as follows:
WBB . . . Black luminance in white-black display: Luminance in a case where the observation side is black display and the other side is white display (black luminance)
BBB . . . Black luminance in black-black display: Luminance in a case where the observation side is black display and the other side is also black display (black luminance)

Formula (1) defines a rate of light that leaks from the other side where white display is performed relative to a visual field on one side where black display is performed. Form Formula (1), in order to reduce a crosstalk rate, two kinds of methods, that is, a method of decreasing the WBB (black luminance in white-black display), and a method of increasing the BBB (black luminance in black-black display) are effective. Decreasing the WBB (black luminance in white-black display) suppresses leak of light from the white display side, and means reduction of crosstalk itself.

Increasing the BBB (black luminance in black-black display), which is another method, means reduction in visibility of crosstalk. In Japanese Translation of PCT Application No. 2008-527440 discloses that the visibility of crosstalk is reduced by adding a certain intensity (luminance) to an individual image. When an image on the observer's side is black, the visibility of crosstalk becomes higher because of high sensitivity of human vision. The addition of a certain low level intensity makes the image move in a gray level range, in which the vision of a human is unlikely to react, thereby enabling the crosstalk to make inconspicuous. However, since the certain intensity is added to the individual image in black display, there is a problem that reduction in a contrast ratio is caused in all of the viewing angle ranges as an adverse effect.

The aforementioned Japanese Patent Application Laid-Open Nos. 2007-264082 and 2008-064917, and PCT International Publication No. WO2007/001071 each mainly disclose a method of mainly preventing front crosstalk of a double screen liquid crystal display device. However, a measure against reverse viewing crosstalk is not sufficient. For example, Japanese Patent Application Laid-Open No. 2007-264082 does not mention a problem of the reverse viewing crosstalk at all. Japanese Patent Application Laid-Open No. 2008-064917 suggests occurrence of the reverse viewing crosstalk, but does not take a particular effective measure. PCT International Publication No. WO2007/001071 indicates that a range, in which a reverse viewing phenomenon occurs, is a range mostly invisible from a driver's seat and a passenger seat (outside 45° or more from the front) in the vehicular double screen liquid crystal display device, but does not mention a method for practically preventing the reverse viewing crosstalk.

SUMMARY OF THE INVENTION

An object of the present invention is to obtain a liquid crystal display device that suppresses crosstalk which occurs between different display images on the basis of different types of pixels, without lowering a contrast ratio in a viewing angle range actually used.

A liquid crystal display device according to the present invention includes a liquid crystal display panel and a parallax barrier part. The liquid crystal display panel performs image display on a display surface by a plurality of pixels. Each of the plurality of pixels is configured to include a liquid crystal layer whose state is changed by voltages applied by first and second pixel electrodes, and the plurality of pixels have at least first type pixels and second type pixels which have respective separated roles.

The parallax barrier part is arranged on a side close to the display surface with respect to the liquid crystal layer, and displays a first display image by the first type pixels and a second display image by the second type pixels in first and second viewing angle ranges which are different from each other. The first and second pixel electrodes have a combination structure in which a corresponding pixel area is classified into a pixel end area and a pixel main area other than the pixel end area, and transmittance of the pixel end area is made relatively higher than transmittance of the pixel main area.

According to the liquid crystal display device of the present invention, by the combination structure of the first and second pixel electrodes, the transmittance in the pixel end area, which contributes to crosstalk occurring between the first and second display images, for each of the plurality of pixels is made relatively higher than the transmittance in the pixel main area, so that the intensity of light transmitted through the pixel end region is selectively set to be high, and the crosstalk can be suppressed. On the other hand, the transmittance of the liquid crystal layer in the pixel main area is set to be relatively lower than the pixel end area, and therefore decrease of a contrast ratio in the pixel main area is suppressed.

As a result, it is possible to obtain a liquid crystal display device that suppresses the crosstalk between the first and second display pixels without substantially lowering the contrast ratio in display of the first and second display images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view showing a sectional configuration of a parallax barrier and a liquid crystal display panel of the liquid crystal display device according to the first preferred embodiment;

FIG. 3 is a graph showing a simulation result of a viewing angle characteristic of a standardized aperture ratio of the multiple view liquid crystal display device;

FIG. 5 is a sectional view showing a cross section taken along the A-A in FIG. 4;

FIG. 6 is a sectional view showing a cross section taken along the B-B in FIG. 4;

FIG. 10 is a graph showing a dielectric constant-voltage characteristic of the liquid crystal layer of the first preferred embodiment;

FIG. 12 is a sectional view showing a first modification of the first preferred embodiment;

FIG. 13 is a sectional view showing a second modification of the first preferred embodiment;

FIG. 15 is a sectional view showing a cross section taken along the C-C in FIG. 14;

FIG. 17 is a sectional view showing a cross section taken along the C-C in FIG. 16.

DESCRIPTION OF THE PREFERRED EMBODIMENTS

First Preferred Embodiment

Figure 1:
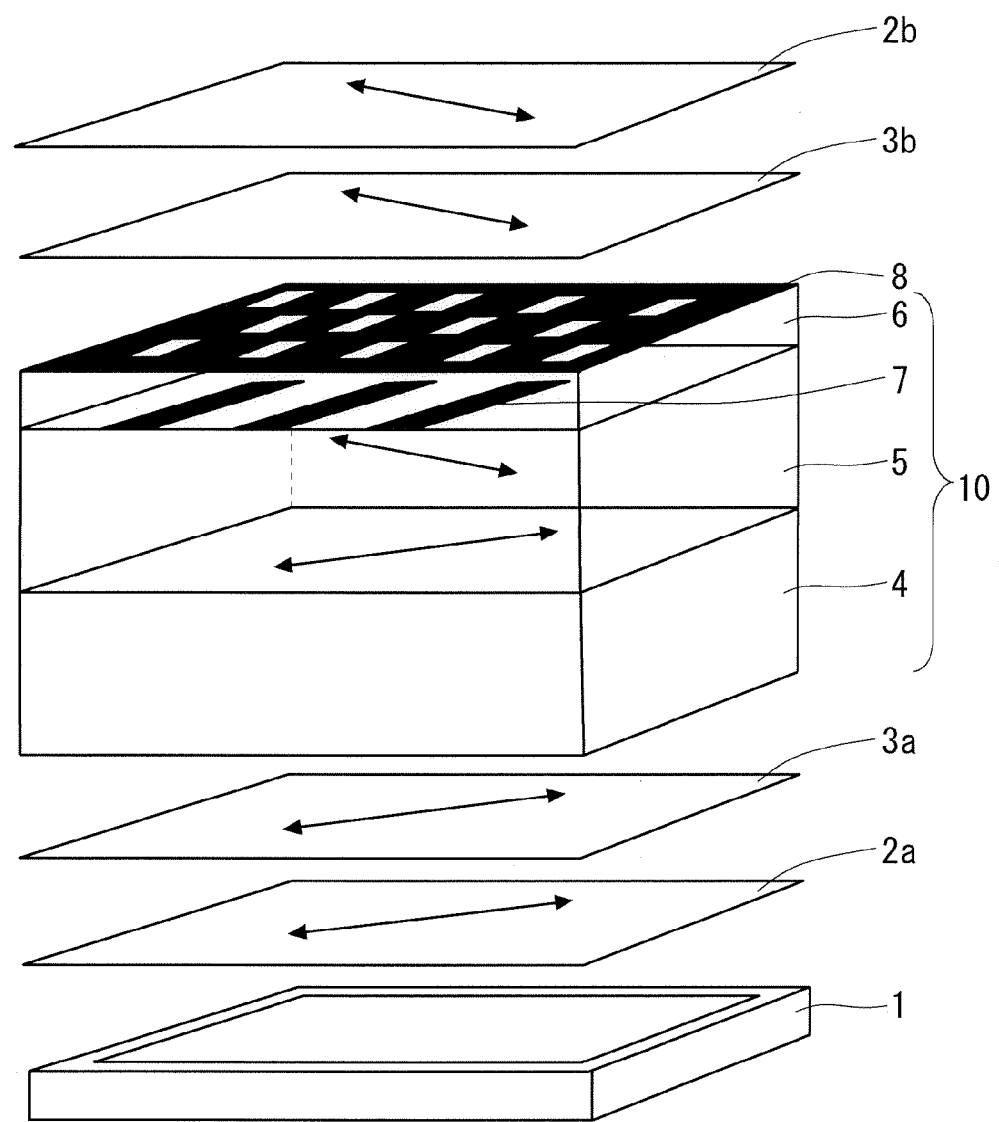
FIG. 1 is an exploded perspective view showing a schematic configuration of a multiple view liquid crystal display device according to a first preferred embodiment of the present invention.

FIG. 1 is an exploded perspective view showing a schematic configuration of a multiple view liquid crystal display device according to a first preferred embodiment of the present invention. As shown in FIG. 1, the liquid crystal display device of the first preferred embodiment is a transmissive display device that is configured by stacking a linear polarizer 2a, a viewing angle compensation film 3a, a liquid crystal panel 10, a parallax barrier 8, a viewing angle compensation film 3b, a linear polarizer 2b in this order on a backlight 1 which is a planar light source device including a light source, a light guide plate, and the like.

The liquid crystal panel 10 is a matrix type display panel that displays an image by a plurality of pixels arranged in a matrix, and has a structure in which a liquid crystal layer 5 is sandwiched between a TFT substrate 4 provided on the backlight 1 side, and a counter substrate 6 provided on the front surface side (viewing side or display surface side).

The counter substrate 6 includes a black matrix 7 on a surface opposed to the TFT substrate 4, and is provided with the parallax barrier 8 on a surface on the viewing side. That is, in this preferred embodiment, the counter substrate 6 is disposed between the parallax barrier 8 and the black matrix 7, and functions as a gap layer that defines an interval between the parallax barrier 8 and the black matrix 7. In each of preferred embodiments including this preferred embodiment, the counter substrate 6 serves as the gap layer. However, the gap layer may be provided separately from the counter substrate 6.

For example, a parallax barrier layer, a black matrix, and a gap layer (resin layer applied and formed to have a predetermined thickness, or the like) provided therebetween may be disposed inside the counter substrate 6 (on the surface, opposed to the TFT substrate 4, of the counter substrate 6).

The respective arrows shown in FIG. 1 indicate the alignment direction of the liquid crystal layer 5, the absorption axes of the linear polarizers 2a and 2b, and the alignment directions of the viewing angle compensation films 3a and 3b.

In this preferred embodiment, the liquid crystal panel 10 is in a TN (Twisted Nematic) mode in which the liquid crystal layer 5 is twistedly aligned at substantially 90° in a state where no electric field is applied. The "twist at substantially 90°" includes twist in a range of 80° to 100°.

In the liquid crystal panel 10, the TFT substrate 4 and the counter substrate 6 are adhered via seal members applied to the peripheral parts thereof, and the liquid crystal layer 5 is sealed inside areas surrounded by the seal members.

The TFT substrate 4 is configured such that pixel electrodes of respective pixels, TFTs (Thin Film Transistors) that are switching elements for supplying image signals to the pixel electrodes, gate wirings (scanning signal wirings) for supplying drive signals to gate electrodes of the TFTs, source wirings (display signal wirings) for supplying image signals to source electrodes of the TFTs, and the like are disposed on a translucent substrate such as a glass substrate, and further includes an alignment film on the outermost surface on the side close to the liquid crystal layer 5.

The counter substrate 6 is configured such that counter electrodes (common electrodes), color filters that are configured from colored layers of red (R), green (G) and blue (B), the black matrix 7 that are a light shielding film for defining display area of each pixel by shielding light between the pixels, and the like are disposed on the surface, close to the liquid crystal layer 5, of the translucent substrate such as the glass substrate. In the parallax barrier system multiple view liquid crystal display device, the parallax barrier 8 is provided on the surface on the viewing side of the counter substrate 6 (surface on the display surface side of the liquid crystal panel 10). Therefore, as described above, the gap between the black matrix 7 and the parallax barrier 8 corresponds to the thickness of the counter substrate 6.

The linear polarizers 2a and 2b each are a film that selectively transmits particular linearly polarized light (P polarization or S polarization). The viewing angle compensation films 3a and 3b each are a WV (Wide Viewing) film which compensates the light such that the viewing angle becomes wide.

In this preferred embodiment, as the linear polarizers 2a and 2b, an absorption type linear polarizer that employs a cellulose triacetate film (TAC) as a substrate, and absorbs linearly polarized light of a polarization axis (absorption axis) orthogonal to linearly polarized light to be transmitted is used. As the linear polarizers 2a and 2b, a reflection type linear polarizer that reflects linearly polarized light of a polarization axis orthogonal to linearly polarized light to be transmitted may be used.

In the normal TN mode, the twist angle of the liquid crystal layer 5 is set to 90°, the respective polarization axis directions of a pair of the linear polarizers 2a and 2b are designed substantially parallel or substantially perpendicular to the alignment directions of liquid crystal molecules on respective end surfaces close to the liquid crystal layer 5. In this preferred embodiment, it is assumed that the liquid crystal layer 5 is twistedly aligned at substantially 90°, in a range of 80° to 100°, as described above, in the state where no electric field is applied, and $\Delta n \cdot d$ value that is a product of refractive index anisotropy $\Delta n$ at a wavelength of 550 nm and the film thickness d of the liquid crystal layer 5 is not less than 300 nm and not more than 400 nm. Furthermore, it is assumed that the respective polarization axis directions of the linear polarizers 2a and 2b are designed substantially parallel to the alignment directions of liquid crystal molecules on the end surfaces close to the liquid crystal layer 5, and the angle formed by the absorption axes of the linear polarizers 2a and 2b is designed to be not less than 85° and not more than 90°.

The multiple view liquid crystal display device according to the first preferred embodiment is a double screen liquid crystal display device that divides and displays two different images on the right and the left with respect to the front. FIG. 2 is a sectional view showing a sectional configuration of the parallax barrier and the liquid crystal display panel of the liquid crystal display device according to the first preferred embodiment.

In the liquid crystal panel 10 of the double screen liquid crystal display device, pixels for right visual field PR (PR1, PR2) that are pixels configuring an image displayed in a viewing angle range on the right with respect to the front of the screen (image for right), in which the viewing angle is "0°" (angle in the normal direction of the liquid crystal panel 10), and pixels for left visual field PL (PL1, PL2) that are pixels configuring an image displayed in a viewing angle range on the left with respect to the front of the screen (image for left) are mixed and disposed in accordance with a predetermined rule. In an example shown in FIG. 2, the pixels for left visual field PL that are first type pixels, and the pixels for right visual field PR that are second type pixels are alternately formed along the horizontal direction (lateral direction in FIG. 2).

The parallax barrier 8 separates the viewing angle range into a right viewing angle range IR1 and a left viewing angle range IL1 to display the images in the respective different directions by separating light of the pixels for right visual field PR and light of the pixels for left visual field PL on the right and the left with respect to the front of the screen, respectively.

The parallax barrier 8 has a light shielding film (light shielding area) that shields light from the pixels for left visual field PL on the right with respect to the front of the screen, and shields light from the pixels for right visual field PR on the left with respect to the front of the screen. That is, the parallax barrier 8 is provided with the light shielding film that has openings 80 for passing only the light from the pixels for right visual field PR to the right with respect to the front of the screen (display surface of the liquid crystal panel 10), and passing only the light from the pixels for left visual field PL to the left with respect to the front of the screen.

The formation pattern of the openings 80 of the parallax barrier 8 varies depending on the array pattern of the pixels for right visual field PR and the pixels for left visual field PL in the liquid crystal panel 10. As long as the parallax barrier 8 is designed such that the right image is correctly displayed on the right with respect to the front of the screen, and the left image is correctly displayed on the left with respect to the front of the screen, any formation pattern may be employed. For example, the openings 80 may be arranged in a checkered pattern (zigzag) in the parallax barrier 8, or may be arranged in stripes in the parallax barrier 8.

With reference to FIG. 2, the principle of image separation in double screen display will be described. As described above, FIG. 2 is the sectional view showing the sectional configuration of the liquid crystal panel 10 of the first preferred embodiment.

As described above, the liquid crystal panel 10 has a structure in which the liquid crystal layer 5 is sandwiched between the TFT substrate 4 on the rear surface side (backlight 1 side), and the counter substrate 6 on the front surface side (viewing side or display surface side) (FIG. 2 schematically shows liquid crystal molecules 51 in the liquid crystal layer 5). Although in the TFT substrate 4, the pixel electrodes of the respective pixels, the TFTs, the gate wirings, the source wirings and the like, which will be described later, are disposed, FIG. 2 shows only source wirings 12 among these.

In the counter substrate 6, the black matrix 7 is formed on the surface opposed to the TFT substrate 4, and the parallax barrier 8 is formed on the surface on the viewing side. In addition to the black matrix 7, the counter electrodes (common electrodes), the color filters, and the like are actually formed on the surface, opposed to the TFT substrate 4, of the counter substrate 6, but are not shown in the drawing.

The black matrix 7 is a light shielding film (light shielding pattern part) that has pixel openings 70 that are openings for defining a display region of each pixel. Herein, it is assumed that the pixels for left visual field PL and the pixels for right visual field PR are alternately arranged horizontally per pixel row. That is, the pixel rows of the pixels for right visual field PR and the pixel rows of the pixels for left visual field PL are alternately arranged in stripes in plan view.

The pixel openings 70 are arranged at positions deviated from the openings 80 of the parallax barrier 8. That is, first light shielding parts 71 of the black matrix 7 are disposed directly under the openings 80 of the parallax barrier 8. The pixels for right visual field PR and the pixels for left visual field PL, which are to be visually recognized from the same openings 80 of the parallax barrier 8 are disposed so as to sandwich the first light shielding parts 71 in plan view.

Also under areas covered with the light shielding part (black part in the drawing) of the parallax barrier 8, second light shielding parts 72 of the black matrix 7 are disposed between the pixels for right visual field PR and the pixels for left visual field PL, which are adjacent to each other in plan view. That is, the light shielding part of the black matrix 7 is configured by the first light shielding parts 71 disposed directly under the openings 80 of the parallax barrier 8, and the second light shielding parts 72 covered with the light shielding area of the parallax barrier 8 disposed directly above the second light shielding parts 72.

In this preferred embodiment, the pixel rows of the pixels for right visual field PR, and the pixel rows of the pixels for left visual field PL are alternately arranged in stripes, and therefore, as in FIG. 2, a plurality of the pixel openings 70 are arranged in stripes in the black matrix 7, the light shielding part of the black matrix 7 has a pattern in which the first light shielding parts 71 and the second light shielding parts 72 are alternately arranged to sandwich the pixel openings 70 therebetween.

The positional relation between the openings 80 of the parallax barrier 8 and the pixel openings 70 of the black matrix 7 has the aforementioned positional relation, so that the right viewing angle range IR1 in which the image for right generated by the pixels for right visual field PR is displayed is set on the right with respect to the front of the screen, and the left viewing angle range IL1 in which the image for left generated by the pixels for left visual field PL is displayed is set on the left with respect to front of the screen. That is, the image for right generated by the pixels for right visual field PR can be visually recognized in the right viewing angle range IR1, and the image for left generated by the pixels for left visual field PL can be visually recognized in the left viewing angle range IL1.

At the position where the right viewing angle range IR1 and the left viewing angle range IL1 are overlapped, crosstalk occurs. Therefore, in the liquid crystal panel 10, the gap between the black matrix 7 and the parallax barrier 8 (thickness of the counter substrate 6), and the positions and diameters of the pixel openings 70 and the openings 80 of the parallax barrier 8 are designed such that the right viewing angle range IR1 and the left viewing angle range IL1 are not overlapped.

In the multiple view liquid crystal display device of this preferred embodiment, the gap between the black matrix 7 and the parallax barrier 8, and the positions and diameters of the pixel openings 70 of the black matrix 7 and the openings 80 of the parallax barrier 8 are designed such that the right viewing angle range IR1 and the left viewing angle range IL1 are separated.

The thickness of the entire counter substrate 6 is determined in accordance with pixel size or a condition of a viewing angle that is required to the display device. For example, in a case where the pixel size is 200 μm, and the viewing angle condition is a range of 60 degrees in the right and left from the front, the maximum thickness of the counter substrate 6, which is allowable to satisfy this viewing angle condition, needs to be set to about 0.09 mm.

FIG. 3 is a graph showing a simulation result of a viewing angle characteristic of a standardized aperture ratio of the multiple view liquid crystal display device designed on the basis of the aforementioned condition. The standardized aperture ratio is an aperture ratio in which a case where all the widths of the pixels can be utilized as light transmissive parts is set to "1". The graph indicated by the dotted line indicates a standardized aperture ratio for the image for right in the right viewing angle ranges IR1 and IR2, and the graph indicated by the solid line indicates a standardized aperture ratio for the image for left in the left viewing angle ranges IL1 and IL2.

The standardized aperture ratio for the image for right, indicated by the broken line in FIG. 3, reaches a peak in the vicinity of a position of 30 degrees in the right from the front in the right viewing angle range IR1, and the standardized aperture ratio for the image for left reaches a peak in the vicinity of a position of 30 degrees in the left from the front in the left viewing angle range IL1. In the vicinity of the front)(0°, both of the standardized aperture ratios of the image for right and the image for left are "0", that is, an area where both the image for right and the image for left are not viewed. This means that the right viewing angle range IR1 of the image for right and the left viewing angle range IL1 of the image for left are separated, and front crosstalk theoretically does not occur.

However, actually, the front crosstalk occurs in the vicinity of the front (viewing angle 0°) due to a light diffraction phenomenon in the openings 80 of the parallax barrier 8, or a light scattering phenomenon in the liquid crystal panel 10.

The crosstalk becomes the largest in a viewing angle range to which the ends of the openings 80 of the parallax barrier 8 contribute, that is, in a viewing angle range in which images are switched. Since the images are switched in the viewing angle range in the vicinity of the front with a viewing angle of "0", the front crosstalk becomes larger. An area of a single pixel that contributes to display in the viewing angle range in which the images are switched in the vicinity of the front is only the end of the pixel opening 70 of the black matrix 7 and the end of the opening 80 of the parallax barrier 8, and the central part of the pixel opening 70 of the black matrix 7 does not contribute.

Therefore, from FIG. 2, in respective pixel areas of the pixels for right visual field PR and the pixels for left visual field PL, pixel area ends on the side close to the first light shielding parts 71 are areas that contribute to the front crosstalk occurring between the image for right and the image for left.

As shown in FIG. 2, a reverse viewing left viewing angle range IL2 exists on the side of the viewing angle that (whose absolute value) is larger than the right viewing angle range IR1, and a reverse viewing right viewing angle range IR2 exists on the side of the viewing angle that is larger than the left viewing angle range IL1. Therefore, reverse viewing crosstalk occurs in the vicinity of the maximum viewing angle of the right viewing angle range IR1, and reverse viewing crosstalk occurs in the vicinity of the maximum viewing angle of the left viewing angle range IL1.

As to the reverse viewing crosstalk, from FIG. 2, in the respective pixel areas of the pixels for right visual field PR and the pixels for left visual field PL, pixel area ends on the side close to the second light shielding parts 72 are areas that contribute to the reverse viewing crosstalk occurring between the image for right and the image for left.

Hereinafter, with reference to FIG. 4 to FIG. 7, the multiple view liquid crystal display device of the first preferred embodiment, which is capable of solving the front crosstalk will be described.

Figure 4:
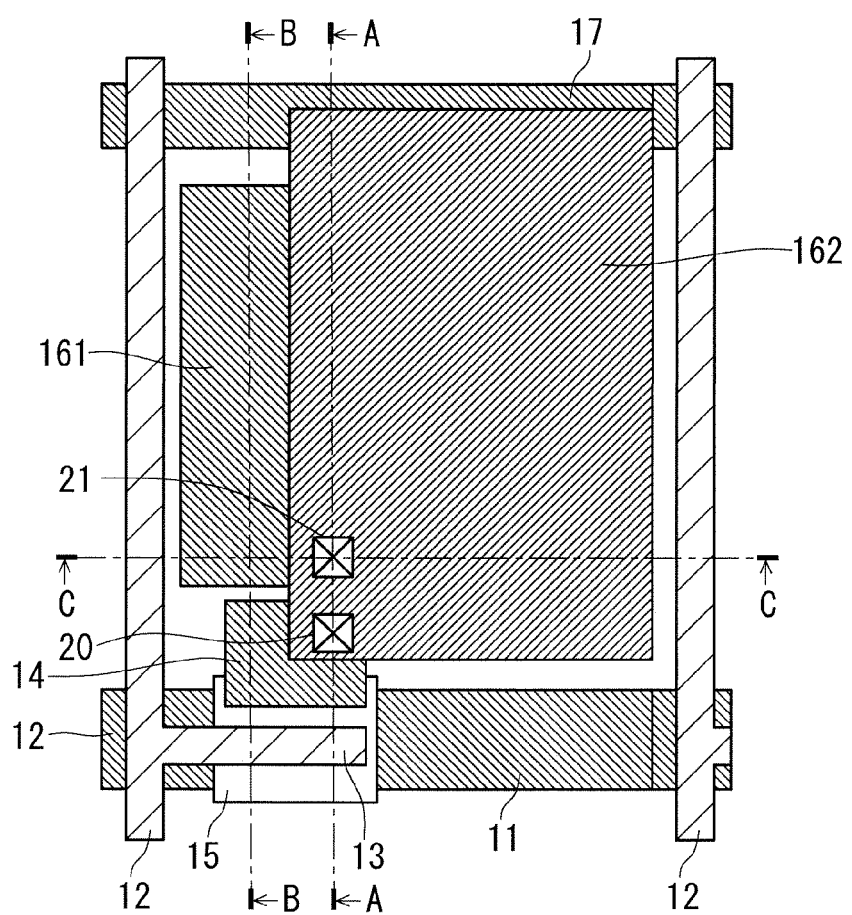
FIG. 4 is a plan view showing a pixel configuration of the multiple view liquid crystal display device according to the first preferred embodiment.
Figure 7:
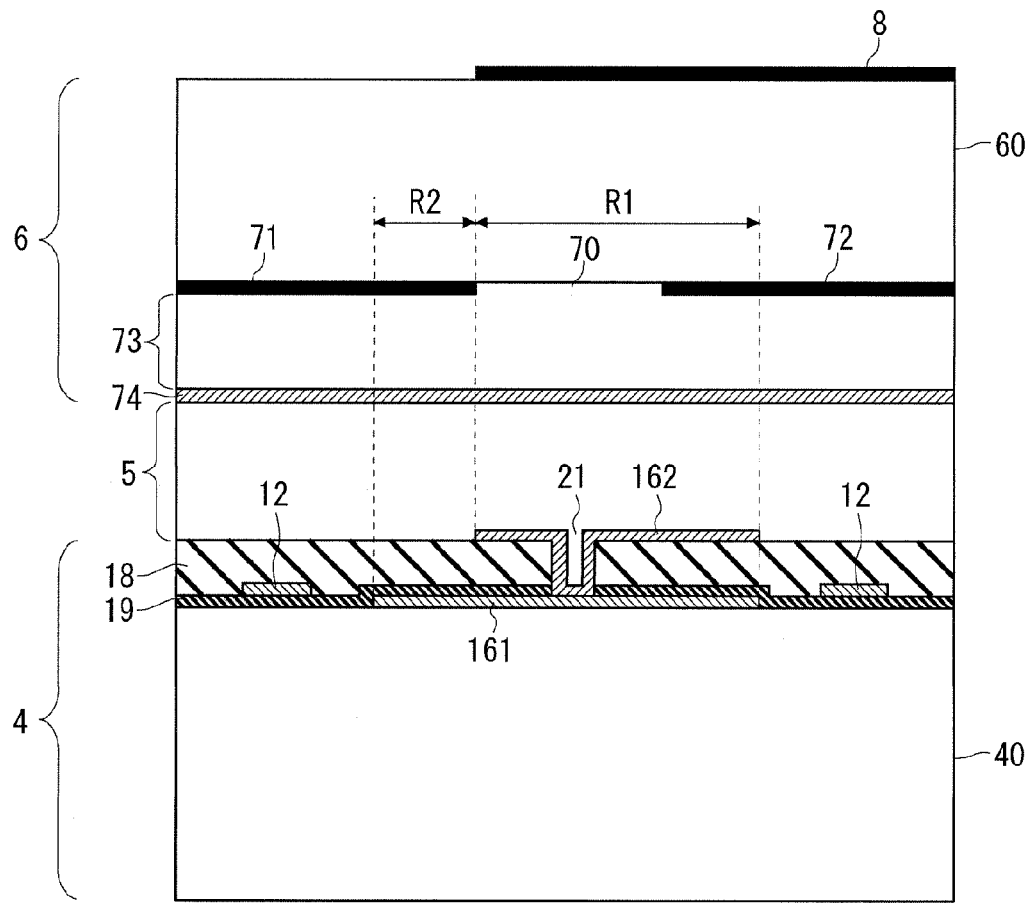
FIG. 7 is a sectional view showing a cross section taken along the C-C in FIG. 4.

FIG. 4 is a plan view showing a pixel configuration of the multiple view liquid crystal display device according to the first preferred embodiment. FIG. 5 is a sectional view showing a cross section taken along the A-A in FIG. 4, FIG. 6 is a sectional view showing a cross section taken along the B-B in FIG. 4, FIG. 7 is a sectional view showing a cross section taken along the C-C in FIG. 4. Furthermore, in FIG. 5 to FIG. 7, in addition to the TFT substrate 4, the liquid crystal layer 5, and the counter substrate 6 are shown.

The pixel electrode of each of the plurality of pixels in the liquid crystal panel 10 includes two types of pixel electrodes in a single pixel, and is configured from a first pixel electrode 161 and a second pixel electrode 162. As shown in FIG. 5 to FIG. 7, the first pixel electrode 161 and the second pixel electrode 162 are formed so as to partially overlap in plan view in a vertically-structured relation in which the second pixel electrode 162 is located above the first pixel electrode 161.

As shown in FIG. 7, in a portion corresponding to (portion directly under) the first light shielding part 71 of the black matrix 7, the second pixel electrode 162 does not exist, and only the first pixel electrode 161 exists. That is, as show in FIG. 4, the first pixel electrode 161 is exposed in plan view. On the upper layer of the first pixel electrode 161 (layer formed on the side close to the liquid crystal layer 5), an insulating film (a gate insulating film 18 and an interlayer insulating film 19) exists. Thus, an area where the first pixel electrode 161 is exposed in plan view between the first pixel electrode 161 and the second pixel electrode 162 is an end area R2.

On the other hand, in a portion corresponding to (portion directly under) the pixel opening 70 of the black matrix 7, the second pixel electrode 162 exists on the uppermost layer of the TFT substrate 4. That is, the first pixel electrode 161 overlaps with the second pixel electrode 162, the first pixel electrode 161 is not exposed in plan view, and only the second pixel electrode 162 is exposed. Additionally, the second pixel electrode 162 is formed on the gate insulating film 18 and the interlayer insulating film 19 except a contact part 21. Thus, an area where the second pixel electrode 162 is exposed in plan view between the first pixel electrode 161 and the second pixel electrode 162 is a main area R1. The second light shielding part 72 is formed above a part of the main area R1.

In the counter substrate 6, a coloring material layer 73 is formed on the back surface side of a glass substrate 60 via the black matrix 7 (the first light shielding part 71, the second light shielding part 72, and the pixel opening 70), and a counter electrode 74 is formed on the coloring material layer 73. The liquid crystal layer 5 is provided between the counter substrate 6 thus configured and the TFT substrate 4. Additionally, the parallax barrier 8 is formed on the front surface side of the glass substrate 60.

The counter electrode 74 is formed on the whole surface of the coloring material layer 73, and the counter electrode 74 is formed at least on an area where the first pixel electrode 161 and the second pixel electrode 162 are formed, and therefore, in a pixel area defined by an area where the counter electrode 74 and the first and second pixel electrodes 161 and 162 are overlapped in plan view, the main area R1 is a pixel main area, and the end area R2 is a pixel end area (horizontal end area).

In such a combination structure of the first pixel electrode 161 and the second pixel electrode 162, voltages (first and second voltages) applied to the liquid crystal layer 5 between the first and second pixel electrodes 161 and 162 and the counter electrode 74 are set such that the first voltage is relatively lower than the second voltage. That is, as to the voltages applied to the liquid crystal layer 5, the first voltage in the end area R2 is relatively lower than the second voltage in the main area R1.

The first light shielding part 71 is invariably formed above the end area R2. That is, the first light shielding part 71 is formed above a whole of the end area R2, and the end area R2 and the first light shielding part 71 are completely overlapped in plan view based on the end area R2. On the other hand, the second pixel electrode 162 invariably exists below the pixel opening 70. That is, the main area R1 exists below the whole area of the pixel opening 70, and the pixel opening 70 and the second pixel electrode 162 are completely overlapped in plan view based on the pixel opening 70. Accordingly, in the main area R1 and the end area R2, only the main area R1 that exists just under the pixel opening 70 is defined as the pixel display area by the black matrix 7, and a part of the main area R1 and the end area R2 are excluded from the pixel display area.

Accordingly, in the first preferred embodiment, a liquid crystal mode of a normally white mode for performing black display by voltage application is employed, and therefore in a case where a lower voltage is applied, from the transmittance-voltage characteristic of the liquid crystal layer 5, the luminance of the applied portion becomes high (light intensity becomes high). As a result, the viewing angle range, to which the end area R2 to which the first voltage relatively lower than the second voltage is applied contributes, that is, the visibility of the front crosstalk can be reduced.

Hereinafter, the details of this preferred embodiment, in which a plurality of voltages, namely the first and second voltages can be employed as voltages applied to liquid crystals, will be described.

In FIG. 4, a gate wiring 11 and a common wiring 17 are formed to extend laterally independently from each other, a plurality of the source wirings 12 are formed to extend longitudinally. A source electrode 13 laterally extends on a semiconductor thin film 15 from the source wiring 12 to be drawn out, and a drain electrode 14 is formed to be opposed to the source electrode 13 on the semiconductor thin film 15. As shown in FIG. 5 to FIG. 7, the second pixel electrode 162 is formed so as to be located on the upper layer of the first pixel electrode 161, so that the second pixel electrode 162 is arranged on the side close to the liquid crystal layer 5, as compared to the first pixel electrode 161.

The interlayer insulating film 19 is provided between the layer of the first pixel electrode 161 and the layer of the second pixel electrode 162, and the interlayer insulating film 19 is formed on the gate insulating film 18. In the preferred embodiment, the gate insulating film 18 and the interlayer insulating film 19 are sometimes simply called an "insulating film".

In a contact part 20, the drain electrode 14 and the second pixel electrode 162 are electrically connected to each other, and in the contact part 21, the first pixel electrode 161 and the second pixel electrode 162 are electrically connected to each other.

Hereinafter, a method of manufacturing the TFT substrate 4 of this preferred embodiment, shown in FIG. 4 to FIG. 7 will be described. First, a metal film is formed on a glass substrate 40 by sputtering, and patterned by a photomechanical process and etching, thereby forming the gate wiring 11 and the common wiring 17.

Then, an ITO film is formed by sputtering, and patterned, thereby forming the first pixel electrode 161. Thereafter, the gate insulating film 18 is formed on the glass substrate 40 including the gate wiring 11, the common wiring 17 and the first pixel electrode 161. Furthermore, the semiconductor thin film is formed and patterned, thereby forming the semiconductor thin film 15 for TFT.

Then, a metal film is formed by sputtering, and patterned, thereby forming the source wirings 12 on the gate insulating film 18, and forming the source electrode 13, and the drain electrode 14 on the gate insulating film 18 and the semiconductor thin film 15. By etching in this pattern formation step, a part of i layer and an n-type semiconductor layer that configures the semiconductor thin film 15 which does not have a metal wiring pattern is removed, and a back-channel-etch type TFT24 that is configured by the gate wiring 11, the gate insulating film 18, the semiconductor thin film 15, the source electrode 13 and the drain electrode 14 are formed.

Furthermore, after the interlayer insulating film 19 is formed on the whole surface, the contact part 20 that electrically connects the second pixel electrode 162 and the drain electrode 14, and the contact part 21 that electrically connects the first pixel electrode 161 and the second pixel electrode 162 are formed.

Then, ITO is formed by sputtering, and patterned, thereby forming the second pixel electrode 162. At this time, the second pixel electrode 162 is electrically connected to the drain electrode 14 via the contact part 20, and electrically connected to the first pixel electrode 161 via the contact part 21. The thicknesses of the gate insulating film 18 and the interlayer insulating film 19 each are 400 nm and 400 nm, and are 800 nm in total.

The uppermost layer of the TFT substrate 4 manufactured by the aforementioned manufacturing method is the interlayer insulating film 19 or the second pixel electrode 162, and the liquid crystal layer 5 is arranged on the TFT substrate 4.

As shown in FIG. 5 to FIG. 7, an insulating film that has a laminate structure of the gate insulating film 18 and the interlayer insulating film 19 is provided on the upper layer of the first pixel electrode 161.

Figure 8:
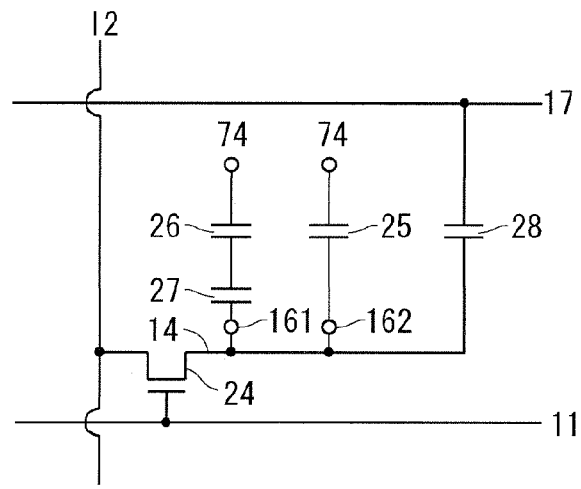
FIG. 8 is a circuit diagram showing an equivalent circuit corresponding to one pixel of the first preferred embodiment.

FIG. 8 is a circuit diagram showing an equivalent circuit corresponding to one pixel of this preferred embodiment. FIG. 8 does not show capacitance of the alignment film, capacitance parasitic between wirings, and the like. As shown in FIG. 8, the first pixel electrode 161 and the second pixel electrode 162 are electrically connected to the drain electrode 14 of the TFT24.

Then, a capacitance 26 and a capacitance 27 are provided in series between the counter electrode 74 and the first pixel electrode 161, a capacitance 25 is formed between the counter electrode 74 and the second pixel electrode 162, and an auxiliary capacitance 28 is formed between the drain electrode 14 and the common wiring 17.

The capacitance 25 is electrostatic capacitance (capacitance value is denoted by C2) corresponding to the liquid crystal layer 5 on the second pixel electrode 162, the capacitance 26 is electrostatic capacitance (capacitance value is denoted by C1) corresponding to the liquid crystal layer 5 on the first pixel electrode 161, the capacitance 27 is capacitance (capacitance value is denoted by Ca) corresponding to the insulating films 18 and 19 on the first pixel electrode 161, and the capacitance 28 is an auxiliary capacitance.

As shown in FIG. 8, the capacitance C1 of the liquid crystal layer 5, and the capacitance Ca of the insulating films 18 and 19 are connected in series between the first pixel electrode 161 and the counter electrode 74. Accordingly, the voltage VP (first voltage) applied to the liquid crystal layer 5 on the first pixel electrode 161 is lower than the voltage VM (second voltage) applied to the liquid crystal layer 5 on the second pixel electrode 162 by the voltage applied to the insulating films 18 and 19.

Thus, the pixel area is configured from the main area R1 to which the voltage VM being a relatively high voltage is applied, and the end area R2 to which the voltage VP being a relatively low voltage is applied. The voltage VM for the main area R1 applied between the second pixel electrode 162 and the counter electrode 74, and the voltage VP for the end area R2 applied to the liquid crystal layer 5 on the first pixel electrode 161 are expressed by the following Formula (2).

$$VP = \{C1/(C1+Ca)\} \cdot VM \quad (2)$$

In Formula (2), C2=C1.

From Formula (2), the voltage VP applied to the liquid crystal layer 5 in the end area R2 is lower than the voltage VM applied to the liquid crystal layer 5 in the main area R1, and the degree of the reduction can be adjusted by the electrostatic capacitances 25 to 27 (capacitance values C1, C2 and Ca) formed on the liquid crystal layer 5 and the insulating film (gate insulating film 18+interlayer insulating film 19).

Figure 9:
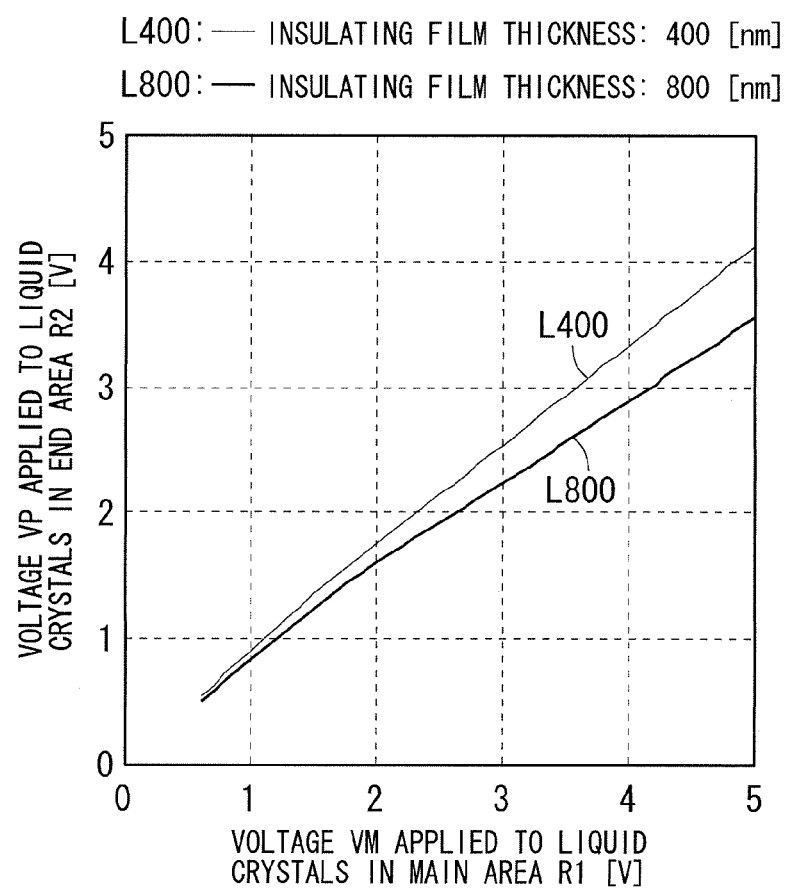
FIG. 9 is a graph showing a comparative example of voltages applied to a liquid crystal layer 5 on a main area and an end area.

FIG. 9 is a graph showing a comparative example of voltages applied to the liquid crystal layer 5 in the main area R1 and the end area R2. For the insulating film (gate insulating film 18 and the interlayer insulating film 19), an SiN film (silicon nitride film) with dielectric constant=7 is used, and the film thickness thereof is two of 400 nm and 800 nm.

FIG. 10 is a graph showing a dielectric constant-voltage characteristic of the liquid crystal layer 5. The liquid crystal layer 5 that is a target of FIG. 9 has a thickness of 4.0 µm, and has a dielectric constant-voltage characteristic shown in FIG. 10.

With FIG. 9, in a case where, from an applied voltage line L800, an SiN film whose thickness is 800 nm is used for the insulating film (the gate insulating film 18 and the interlayer insulating film 19), when the voltage VM applied to the liquid crystal layer 5 in the main area R1 is 4.5 V, the voltage VP applied to the liquid crystal layer 5 in the end area R2 can be made 3.2 V.

In a case where, from an applied voltage line L400, an SiN film whose thickness is 400 nm is used for the insulating film, when the voltage VM applied to the liquid crystal layer 5 in the main area R1 is 4.5 V, the voltage VP applied to the liquid crystal layer 5 in the end area R2 can be made 3.7 V.

Thus, the quality of the material and the film thickness of the insulating film are adjusted, so that the voltage VP obtained by division at a desired ratio relative to the voltage VM can be obtained. That is, the effective voltages (VM, VP) that drive the liquid crystal layer 5 can be made different between the main area R1 and the end area R2.

Figure 11A:
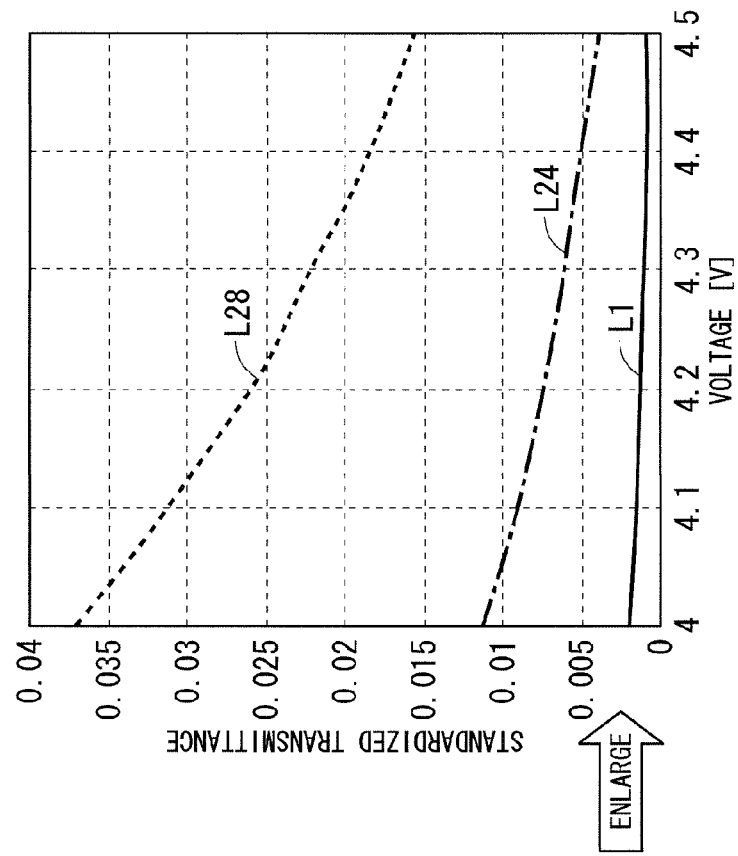
FIGS. 11A and 11B each are a graph showing transmittance-voltage characteristics of the liquid crystal layer of the first preferred embodiment.
Figure 11B:
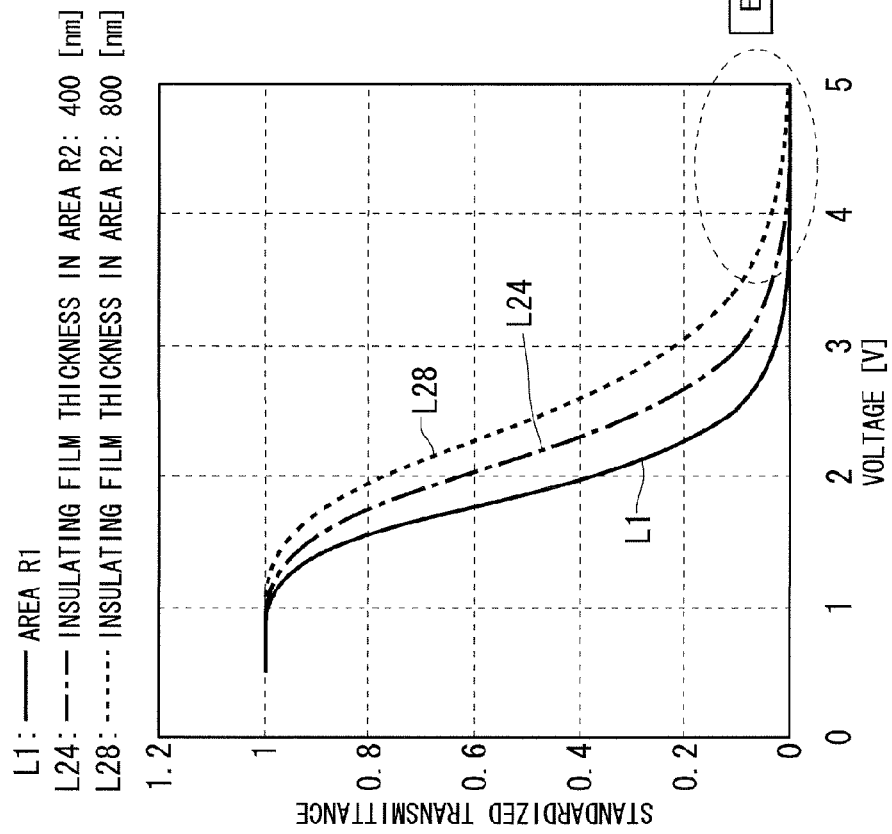

FIGS. 11A and 11B each are a graph showing a transmittance-voltage characteristic of liquid crystals (thickness of the liquid crystal layer 5 is 4.0 µm) which is the same as the liquid crystals in FIG. 10. In FIGS. 11A and 11B, an abscissa represents a voltage applied to the first pixel electrode 161 (second pixel electrode 162), and is equal to the voltage VM. As shown in FIGS. 11A and 11B, the transmittance of the liquid crystal layer 5 has negative correlation to the voltage applied to the first pixel electrode 161 (second pixel electrode 162).

From comparison of an area R1 voltage application line L1 with an area R2 voltage application line L28, shown in FIGS. 11A and 11B, in a case where in order to perform black display, a voltage of 4.5V (VM) is applied to the second pixel electrode 162 being a pixel central electrode part in the main area R1, by using the SiN film with a thickness of 800 nm as the insulating film, 3.2 V (VP) is applied to the first pixel electrode 161 being a pixel peripheral electrode in the end area R2, and therefore it is found that the transmittance in the end area R2 in black display can be made about 15 times higher than the transmittance in the main area R1.

From comparison of the area R1 voltage application line L1 with an area R2 voltage application line L24, in a case where the SiN film with a thickness of 400 nm is used as the insulating film, when a voltage applied to the liquid crystal layer 5 in the main area R1 is 4.5V (VM), a voltage applied to the liquid crystals in the end area R2 is 3.7V (VP), and therefore it is found by FIGS. 11A and 11B that the transmittance in the end area R2 in black display can be made about 4 times higher than the transmittance in the main area R1.

Thus, between the main area R1 and the end area R2, the effective voltages (VM, VP) for drive, which change the state of the liquid crystal layer 5, are changed, so that the transmittance of liquid crystal layer 5 in the end area R2 can be made relatively higher than that in the main area R1.

Accordingly, in the first preferred embodiment, the film thickness of the insulating film (the gate insulating film 18 and the interlayer insulating film 19) formed on the first pixel electrode 161 is changed, so that desired black luminance transmittance in the end area R2 can be obtained. This technology is a technology effective to the liquid crystal mode of the normally white mode for performing black display by voltage application.

Thus, in the first preferred embodiment, by the aforementioned combination structure of the first pixel electrode 161 and the second pixel electrode 162, the transmittance (of the liquid crystal layer 5) in the end area R2 (pixel end area on the first light shielding part 71 side), which contributes to the front crosstalk occurring between the image for left and the image for right (first and second display images) by the pixels for left visual field PL (first type pixels) and the pixels for right visual field PR (second type pixels) alternately horizontally formed, for each of the plurality of pixels is set to be relatively higher than the transmittance in the main area R1.

Therefore, the intensity of light transmitted through the end area R2 is selectively set to be high, particularly, the black luminance transmittance is enhanced, thereby enabling suppression of the front crosstalk. On the other hand, the transmittance in the main area R1 is set to be relatively lower than that in the end area R2, particularly, the black luminance transmittance is made fully low, thereby avoiding lowering of the contrast ratio in the main area R1.

That is, in the multiple view liquid crystal display device of this preferred embodiment, even when a light diffraction phenomenon in the opening 80 of the parallax barrier 8, a light scattering phenomenon in the liquid crystal panel 10, or the like occurs, the light intensity in the end area R2 is enhanced, so that the front crosstalk is suppressed, and visibility of the front crosstalk can be lowered without lowering the contrast ratio in the viewing angle range mainly used (viewing angle range in the main area R1 just under the pixel opening 70).

As a result, it is possible to obtain a liquid crystal display device that suppresses the front crosstalk without substantially lowering the contrast ratio in display of an image for left and an image for right.

Furthermore, by invariably forming the first light shielding part 71 of the black matrix 7 on the end area R2, the end area R2 is excluded from a display pixel area, and therefore even when the transmittance of the liquid crystal layer 5 in the end area R2 is made relatively high, the contrast ratio in the used viewing angle range is never lowered.

A manufacturing process particularly required to enhance the transmittance of the liquid crystal layer 5 in the end area R2 is substantially only a step of forming the insulating film (the gate insulating film 18 and the interlayer insulating film 19) on the first pixel electrode 161, and therefore the aforementioned electrode combination structure can be implemented by the relatively easy manufacturing process.

(Modification)

FIG. 12 and FIG. 13 are sectional views of first and second modifications of the first preferred embodiment. FIG. 12 and FIG. 13 each correspond to a C-C cross section of FIG. 4. As shown in FIG. 12, in the first modification, the end of a second pixel electrode 162 is arranged inside a first light shielding part 71 of a black matrix of a counter substrate 6. That is, a part (D1) of the second pixel electrode 162 is formed just under the first light shielding part 71.

In a case of the first modification shown in FIG. 12, stray light due to an influence of diffracted light or scattered light from an end area R2 can be also reliably shielded by the first light shielding part 71, and therefore it is possible to further lower the visibility of front crosstalk without decreasing a contrast ratio in a mainly used viewing angle range.

On the other hand, the second modification shown in FIG. 13 shows a structure in which the end of a second pixel electrode 162 is arranged just under a pixel opening 70 of a black matrix of a counter substrate 6, that is, a structure in which a part (D2) of an end area R2 is not shielded by a first light shielding part 71 of the black matrix 7.

In a case of such a second modification, although a contrast ratio in a part of a mainly used viewing angle range (exposed part of a first pixel electrode 161 under the pixel opening 70 in plan view) is decreased, and therefore visibility of crosstalk can be lowered as well in the mainly used viewing angle range except front crosstalk (e.g., in the vicinity of viewing angles of ±30° assuming main utilization).

Second Preferred Embodiment

Figure 14:
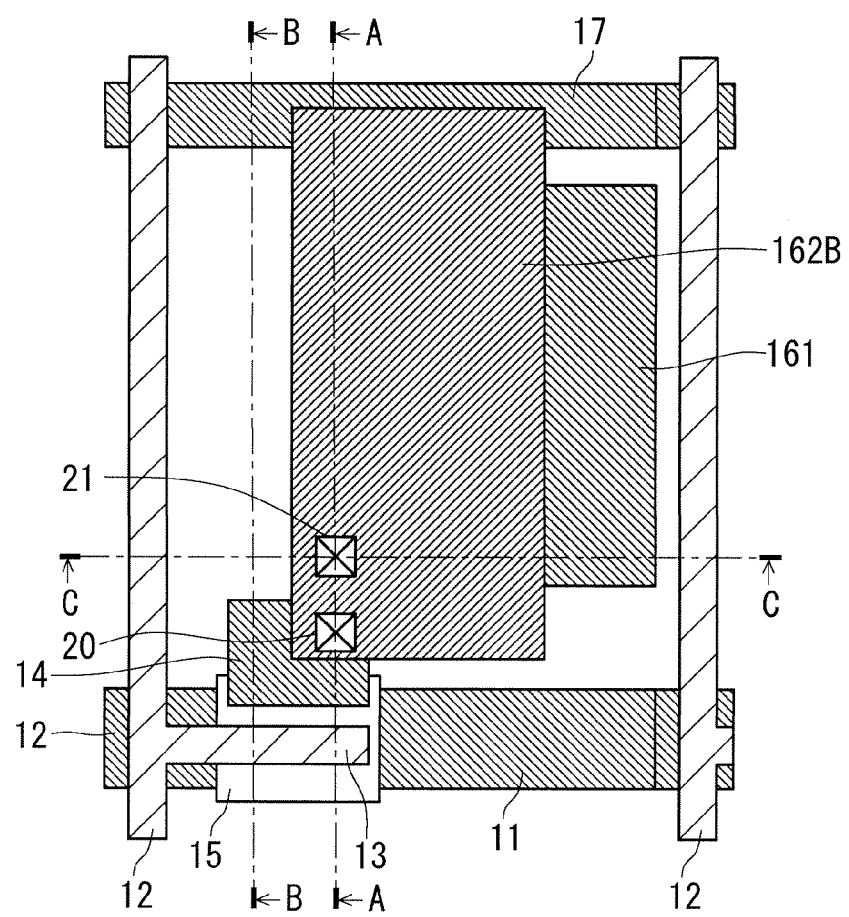
FIG. 14 is a plan view showing a pixel configuration of a multiple view liquid crystal display device according to the second preferred embodiment.

FIG. 14 is a plan view showing a pixel configuration of a multiple view liquid crystal display device according to a second preferred embodiment. FIG. 15 is a sectional view showing a cross section taken along the C-C in FIG. 14.

Furthermore, FIG. 15 shows a liquid crystal layer 5, and a counter substrate 6, in addition to a TFT substrate 4. A whole configuration of the liquid crystal display device of the second preferred embodiment is similar to that of the first preferred embodiment shown in FIG. 1 and FIG. 2.

In FIG. 14 and FIG. 15, components that are similar to those of the first preferred embodiment are denoted by the same reference numerals, and description thereof will be appropriately omitted. The multiple view liquid crystal display device of the second preferred embodiment aims at lowering visibility of the aforementioned "reverse viewing crosstalk".

With reference to FIG. 14 and FIG. 15, the principle of lowering the visibility of the reverse viewing crosstalk in the liquid crystal display device of the second preferred embodiment will be described.

The reverse viewing crosstalk is crosstalk resulting from a reverse viewing phenomenon that occurs in the vicinity of the outer end (maximum viewing angle) of the viewing angle range of each of display images. The reverse viewing phenomenon is crosstalk resulting from a reverse viewing left viewing angle range IL2 generated at a viewing angle larger than a right viewing angle range IR1 in FIG. 2, and a reverse viewing right viewing angle range IR2 generated at a viewing angle larger than a left viewing angle range IL1 in FIG. 2.

That is, the reverse viewing crosstalk is a crosstalk phenomenon that occurs in the vicinity of the outer ends (maximum viewing angle) of the right viewing angle range IR1 and the left viewing angle range IL1 due to light which leaks from the reverse viewing left viewing angle range IL2 and the reverse viewing right viewing angle range IR2.

In order to lower the visibility of the reverse viewing crosstalk, in the second preferred embodiment, a constant intensity (luminance) is lowered by addition of only an area that contributes to reverse viewing crosstalk, which is a part of an individual image.

In the second preferred embodiment, the transmittance of the liquid crystal layer 5 in only a pixel area, which contributes to a viewing angle range in which the reverse viewing crosstalk is visually recognized, in black display is increased. As a result of the increased black luminance, the visibility of the reverse viewing crosstalk can be decreased. At this time, it is necessary not to add a constant intensity to an original individual image in an actually used viewing angle range, that is, not to decrease a contrast ratio in the actually used viewing angle range.

In FIG. 14 and FIG. 15, a pixel electrode in the liquid crystal panel 10 includes two types of pixel electrodes in a single pixel, and is configured from a first pixel electrode 161 and a second pixel electrode 162B. As shown in FIG. 15, the first pixel electrode 161 and the second pixel electrode 162B are formed so as to partially overlap in plan view in a vertically-structured relation in which the second pixel electrode 162B is located above the first pixel electrode 161.

As shown in FIG. 15, in a portion corresponding to (portion directly under) a second light shielding part 72 of a black matrix 7, the second pixel electrode 162 does not exist, and only the first pixel electrode 161 exists. That is, as shown in FIG. 14, the first pixel electrode 161 is exposed in plan view. On the upper layer of the first pixel electrode 161 (layer formed on the side close to the liquid crystal layer 5), an insulating film (a gate insulating film 18 and an interlayer insulating film 19) exists. Thus, an area where the first pixel electrode 161 is exposed in plan view between the first pixel electrode 161 and the second pixel electrode 162B is an end area R3.

On the other hand, in a portion corresponding to (portion directly under) a pixel opening 70 of the black matrix 7, the second pixel electrode 162B exists on the uppermost layer of the TFT substrate 4. That is, the first pixel electrode 161 overlaps with the second pixel electrode 162B in plan view, the first pixel electrode 161 is not exposed in plan view, and only the second pixel electrode 162B is exposed. Additionally, the second pixel electrode 162B is formed on the gate insulating film 18 and the interlayer insulating film 19 except a contact part 21. Thus, an area where the second pixel electrode 162B is exposed in plan view between the first pixel electrode 161 and the second pixel electrode 162 is a main area R1.

On the other hand, a counter electrode 74 is formed on an area where at least the first pixel electrode 161 and the second pixel electrode 162B are formed, and therefore the main area R1 is a pixel main area, and the end area R3 is a pixel end area (horizontal end area).

In such a combination structure of the first pixel electrode 161 and the second pixel electrode 162B, voltages VP and VM (first and second voltages) applied to the liquid crystal layer 5 between the first and second pixel electrodes 161 and 162B and the counter electrode 74 are set such that the voltage VP on the end area R3 is relatively lower than the voltage VM on the main area R1, by a principle similar to that of the first preferred embodiment.

The second light shielding part 72 is invariably formed above the end area R3. That is, the second light shielding part 72 is formed above the whole end area R3, and the end area R3 and the second light shielding part 72 are completely overlapped in plan view based on the end area R3. On the other hand, the second pixel electrode 162B invariably exists below the pixel opening 70. That is, the main area R1 exists below the whole area of the pixel opening 70, and the pixel opening 70 and the second pixel electrode 162B are completely overlapped in plan view based on the pixel opening 70. Accordingly, in the main area R1 and the end area R3, only the main area R1 that exists just under the pixel opening 70 is defined as the pixel display area by the black matrix 7, and a part of the main area R1 and the end area R3 are excluded from the pixel display area.

Accordingly, in the second preferred embodiment, a liquid crystal mode of a normally white mode for performing black display by voltage application is employed, and therefore in a case where a lower voltage is applied, from the transmittance-voltage characteristic of the liquid crystal layer 5, the luminance of the applied portion becomes high (light intensity becomes high). As a result, the viewing angle range, to which the end area R3, to which the voltage VP lower than the voltage VM is applied, contributes, that is, the visibility of a viewing angle range, in which the reverse viewing crosstalk occurs, can be reduced.

The TFT substrate 4 shown in the second preferred embodiment can be manufactured by a manufacturing process similar to the first preferred embodiment, except a patterning shape of the second pixel electrode 162B. Additionally, the film thickness of the insulating film (the gate insulating film 18 and the interlayer insulating film 19) is changed, so that desired black luminance transmittance in the end area R3 can be obtained. This is similar to the first preferred embodiment.

Thus, in the second preferred embodiment, by the aforementioned combination structure of the first pixel electrode 161 and the second pixel electrode 162B, the transmittance in the end area R3 (pixel end area on the second light shielding part 72 side), which contributes to the reverse viewing crosstalk occurring between an image for left and an image for right by pixels for left visual field PL and pixels for right visual field PR alternately horizontally formed, for each of the plurality of pixels is set to be relatively higher than the transmittance in the main area R1.

Therefore, the intensity of light transmitted through the end area R3 is selectively set to be high, particularly, the black luminance transmittance is enhanced, thereby enabling suppression of the reverse viewing crosstalk. On the other hand, the transmittance in the main area R1 is set to be relatively lower than that in the end area R3, particularly, the black luminance transmittance is made fully low, thereby avoiding lowering of the contrast ratio in the main area R1.

That is, in the multiple view liquid crystal display device of this preferred embodiment, even when a light diffraction phenomenon in the opening 80 of the parallax barrier 8, a light scattering phenomenon in the liquid crystal panel 10, or the like occurs, the light intensity in the end area R3 is enhanced, so that the reverse viewing crosstalk is suppressed, and the visibility of the reverse viewing crosstalk can be lowered without lowering the contrast ratio in the viewing angle range mainly used (viewing angle range in the main area R1 just under the pixel opening 70).

As a result, it is possible to obtain a liquid crystal display device that suppresses the reverse viewing crosstalk without substantially lowering the contrast ratio in display of an image for left and an image for right.

Furthermore, by invariably forming the second light shielding part 72 of the black matrix 7 on the end area R3, the end area R3 is excluded from a display pixel area, and therefore even when the light intensity in the end area 3 is enhanced, the contrast ratio in the used viewing angle range is never lowered.

A manufacturing process particularly required to enhance the transmittance of the liquid crystal layer 5 in the end area R3 is substantially only a step of forming the insulating film (the gate insulating film 18 and the interlayer insulating film 19) on the first pixel electrode 161, and therefore the aforementioned electrode combination structure can be implemented by the relatively easy manufacturing process.

(Modification)

Also in the second preferred embodiment, modifications similar to those of the first preferred embodiment can be implemented. That is, a third modification (corresponding to the first modification of the first preferred embodiment), in which a part of a second pixel electrode 162B is formed just under a second light shielding part 72, is possible.

In the third modification, it is possible to further lower visibility of front crosstalk without decreasing a contrast ratio in a mainly used viewing angle range, similarly to the first modification.

Furthermore, as a fourth modification, a structure, in which a part of an end area R3 is not shielded by a second light shielding part 72 of a black matrix 7 (corresponding to the second modification of the first preferred embodiment) is possible.

In the fourth modification, although a contrast ratio in a part of a mainly used viewing angle range (exposed part of a first pixel electrode 161 under a pixel opening 70 in plan view) is decreased, visibility of crosstalk in the mainly used viewing angle range except reverse viewing crosstalk can be lowered, similarly to the second modification of the first preferred embodiment.

Third Preferred Embodiment

Figure 16:
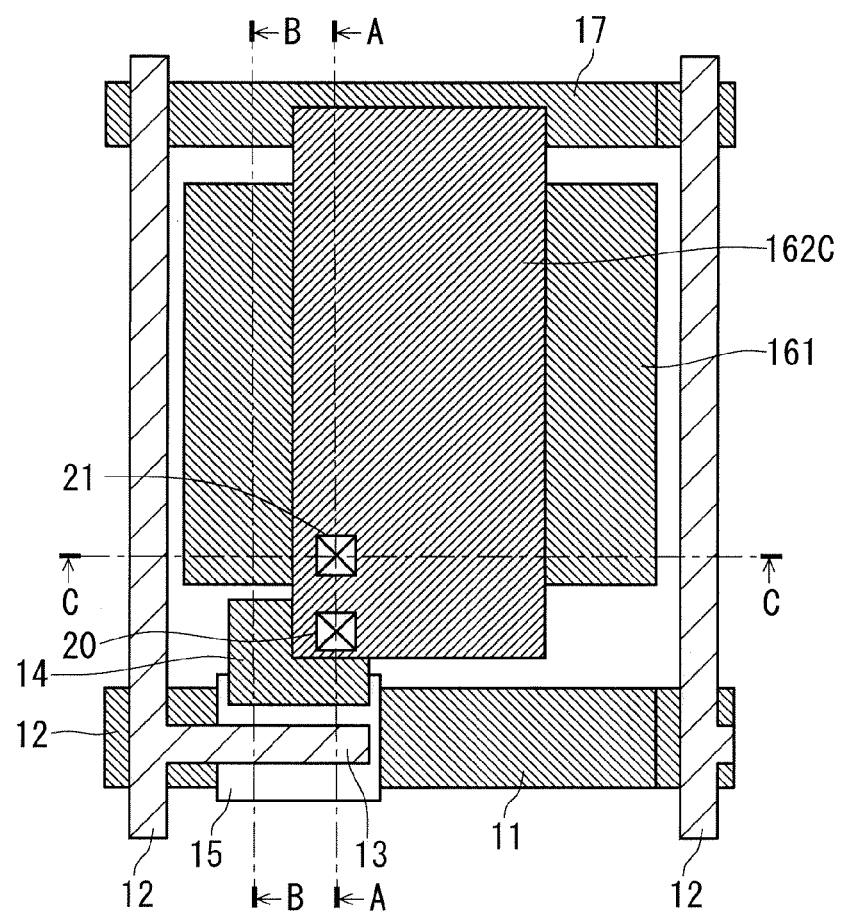
FIG. 16 is a plan view showing a pixel configuration of a multiple view liquid crystal display device according to a third preferred embodiment.

FIG. 16 is a plan view showing a pixel configuration of a multiple view liquid crystal display device according to a third preferred embodiment. FIG. 17 is a sectional view showing a cross section taken along the C-C in FIG. 16. Furthermore, FIG. 17 shows a liquid crystal layer 5, and a counter substrate 6, in addition to a TFT substrate 4. A whole configuration of the liquid crystal display device of the third preferred embodiment is similar to that of the first preferred embodiment shown in FIG. 1 and FIG. 2.

In FIG. 16 and FIG. 17, components that are similar to those of the first and second preferred embodiments are denoted by the same reference numerals, and description thereof will be appropriately omitted. The multiple view liquid crystal display device of the third preferred embodiment aims at lowering visibility of "front crosstalk" and "reverse viewing crosstalk" together.

In the third preferred embodiment, the liquid crystal transmittance only in a pixel area, which contributes to each of viewing angle ranges in which the front crosstalk and the reverse viewing crosstalk are visually recognized, in black display is increased. As a result of the increased black luminance, the visibility of the front crosstalk and the reverse viewing crosstalk can be decreased. At this time, it is necessary not to add a constant intensity to an original individual image in an actually used viewing angle range, that is, not to decrease a contrast ratio in the actually used viewing angle range.

In FIG. 16 and FIG. 17, a pixel electrode in a liquid crystal panel 10 includes two types of pixel electrodes in a single pixel, and is configured from a first pixel electrode 161 and a second pixel electrode 162C. As shown in FIG. 17, the first pixel electrode 161 and the second pixel electrode 162C are formed so as to partially overlap in plan view in a vertically-structured relation in which the second pixel electrode 162C is located above the first pixel electrode 161.

As shown in FIG. 17, in a portion corresponding to (portion directly under) a first light shielding part 71 and a second light shielding part 72 of a black matrix 7, the second pixel electrode 162C does not exist, and only the first pixel electrode 161 exists. That is, the first pixel electrode 161 is exposed in plan view. On the upper layer of the first pixel electrode 161 (layer formed on the side close to the liquid crystal layer 5), an insulating film (a gate insulating film 18 and an interlayer insulating film 19) exists. Thus, areas formed just under the first light shielding part 71 and the second light shielding part 72 on areas where the first pixel electrode 161 is exposed in plan view between the first pixel electrode 161 and the second pixel electrode 162C is an end area R2 and an end area R3.

On the other hand, in a portion corresponding to (portion directly under) a pixel opening 70 of the black matrix 7, the second pixel electrode 162C exists on the uppermost layer of the TFT substrate 4. That is, the first pixel electrode 161 overlaps with the second pixel electrode 162C in plan view, the first pixel electrode 161 is not exposed in plan view, and only the second pixel electrode 162C is exposed. Additionally, the second pixel electrode 162C is formed on the gate insulating film 18 and the interlayer insulating film 19 except a contact part 21. Thus, an area where the second pixel electrode 162C is exposed in plan view between the first pixel electrode 161 and the second pixel electrode 162C is a main area R1.

On the other hand, a counter electrode 74 is formed on an area where at least the first pixel electrode 161 and the second pixel electrode 162C are formed, and therefore the main area R1 is a pixel main area, and the end area R2 and the end area R3 are respective pixel end areas on the first light shielding parts 71 side and the second light shielding parts 72 side.

In such a combination structure of the first pixel electrode 161 and the second pixel electrode 162C, voltages (a voltage VP and a voltage VM) applied to the liquid crystal layer 5 between the first and second pixel electrodes 161 and 162C and the counter electrode 74 are set such that the respective voltages VP on the end areas R2 and R3 are relatively lower than the voltage VM on the main area R1, by a principle similar to that of the first preferred embodiment.

The first light shielding parts 71 is invariably formed above the end area R2, and the second light shielding part 72 is invariably formed above the end area R3. That is, the end area R2 and the first light shielding part 71 are completely overlapped in plan view based on the end area R2, and the end area R3 and the second light shielding part 72 are completely overlapped in plan view based on the end area R3. On the other hand, the second pixel electrode 162C invariably exists below the pixel opening 70. That is, the pixel opening 70 and the second pixel electrode 162C are completely overlapped in plan view. Accordingly, in the main area R1, the end area R2 and the end area R3, only the main area R1 that exists just under the pixel opening 70 is defined as the pixel display area by the black matrix 7, and both the end area R2 and the end area R3 are excluded from the pixel display area.

Accordingly, similarly to the first preferred embodiment and the second preferred embodiment, in the third preferred embodiment, a liquid crystal mode of a normally white mode for performing black display by voltage application is employed, and therefore in a case where a lower voltage is applied, from the transmittance-voltage characteristic of the liquid crystal layer 5, the luminance of the applied portion becomes high (light intensity becomes high). As a result, the viewing angle range, to which the end area R2 and the end area R3, to which the voltages VP lower than the voltage VM are applied, contributes, that is, the visibility in viewing angle ranges, in which the front crosstalk and the reverse viewing crosstalk occur, can be reduced.

The TFT substrate 4 shown in the third preferred embodiment can be manufactured by a manufacturing process similar to the first preferred embodiment, except a patterning shape of the second pixel electrode 162C. Additionally, the film thickness of the insulating film (the gate insulating film 18 and the interlayer insulating film 19) is changed, so that desired black luminance transmittance in the end area R2 and the end area R3 can be obtained. This is similar to the first and second preferred embodiments.

Thus, in the third preferred embodiment, by the aforementioned combination structure of the first pixel electrode 161 and the second pixel electrode 162C, the transmittance in the end area R2 (pixel end area on the first light shielding part 71 side) and the transmittance in the end area R3 (pixel end area on the second light shielding part 72 side), which contribute to the front crosstalk and the reverse viewing crosstalk occurring between an image for left and an image for right by pixels for left visual field PL and pixels for right visual field PR alternately horizontally formed, for each of the plurality of pixels are set to be relatively higher than the transmittance in the main area R1.

Therefore, the intensity of light transmitted through each of the end area R2 and the end area R3 is selectively set to be high, particularly, the black luminance transmittance is enhanced, thereby enabling suppression of the front crosstalk and the reverse viewing crosstalk. On the other hand, the transmittance in the main area R1 is set to be lower than that in the end area R3, particularly, the black luminance transmittance is made fully low, thereby avoiding lowering of the contrast ratio in the main area R1.

That is, in the multiple view liquid crystal display device of this preferred embodiment, even when a light diffraction phenomenon in an opening 80 of a parallax barrier 8, a light scattering phenomenon in the liquid crystal panel 10, or the like occurs, the light intensities in the end area R2 and the end area R3 are enhanced, so that the front crosstalk and the reverse viewing crosstalk are suppressed, and the visibility of the front crosstalk and the reverse viewing crosstalk can be lowered without lowering the contrast ratio in the viewing angle range mainly used (viewing angle range in the main area R1 just under the pixel opening 70).

As a result, it is possible to obtain a liquid crystal display device that suppresses the front crosstalk and the reverse viewing crosstalk without substantially lowering the contrast ratio in display of an image for left and an image for right.

Furthermore, by invariably forming the first light shielding part 71 and the second light shielding part 72 of the black matrix 7 on the end area R2 and the end area R3 respectively, the end area R2 and end area R3 are excluded from a display pixel area, and therefore even when the light intensities in the end area 2 and the end area 3 are enhanced, the contrast ratio in the used viewing angle range is never lowered.

A manufacturing process particularly required to enhance the transmittance of the liquid crystal layer 5 in the end area R2 and the end area R3 is substantially a step of forming the insulating film (the gate insulating film 18 and the interlayer insulating film 19) on the first pixel electrode 161, and therefore the aforementioned electrode combination structure can be implemented by the relatively easy manufacturing process.

(Modification)

Also in the third preferred embodiment, modifications similar to those of the first and second preferred embodiments can be implemented. That is, a first modification, in which a part of a second pixel electrode 162C is formed just under a first light shielding part 71, and a third modification, in which a part of a second pixel electrode 162C is formed just under a second light shielding part 72, are possible. These modifications produce similar effects.

Furthermore, as third and fourth modifications, a structure, in which a part of an end area R2 is not shielded by a first light shielding part 71 of a black matrix 7, and a structure, in which a part of an end area R3 is not shielded by a second light shielding parts 72 of a black matrix 7 are possible. These modifications produce similar effects.

Others

In each of the aforementioned first preferred embodiment to third preferred embodiment, the double screen liquid crystal display device displays different images in two of right and left directions. However, the present invention is also applicable to, for example, a multiple view liquid crystal display device, in which pixels that display three or more images are two-dimensionally arranged, and the different images are displayed in three or more different directions. In this case, in the three or more images, each of pixel areas, which contributes to a viewing angle at which the types of the images are switched, is set in a manner similar to the end area R2 or the end area R3, and an area other than the pixel area is set in a manner similar to the main area R1, thereby implementing a pixel structure. Consequently, the pixel structure shown in each of the first preferred embodiment to third preferred embodiment can be applied. Additionally, although the parallax barrier 8 is a single layer in the aforementioned description, but a plurality of layers may be provided as needed.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a liquid crystal display panel configured to perform image display on a display surface by a plurality of pixels, each of said plurality of pixels being configured to include a liquid crystal layer whose state is changed by voltages applied to first and second pixel electrodes, and said plurality of pixels having at least first type pixels and second type pixels which have respective separated roles; and
   a parallax barrier part arranged on a side close to said display surface with respect to said liquid crystal layer, and configured to display a first display image by said first type pixels and a second display image by said second type pixels in first and second viewing angle ranges which are different from each other, wherein
   said first and second pixel electrodes have a combination structure in which a corresponding pixel area is classified into a pixel end area and a pixel main area other than said pixel end area, said structure configured to make the transmittance of said pixel end area relatively higher than the transmittance of said pixel main area.

2. The liquid crystal display device according to claim 1, wherein
   said first and second pixel electrodes apply first and second voltages to said liquid crystal layer that is interposed between a counter electrode and said first and second pixel electrodes, an area sandwiched between said first and second pixel electrodes and said counter electrode is said pixel area, and transmittance of said liquid crystal layer has negative correlation with said first and second voltages,
   said first and second pixel electrodes are formed so as to partially overlap in plan view in a vertically-structured relation in which the second pixel electrode is located above the first pixel electrode,
   in said pixel area, an area where said first pixel electrode is exposed in plan view is said pixel end area, and an area where said second pixel electrode is exposed in plan view is said pixel main area in said first and second pixel electrodes, and
   an insulating film is formed on said first pixel electrode and under said liquid crystal layer, so that said first voltage is made relatively lower than said second voltage by a capacitive component generated by said insulating film.

3. The liquid crystal display device according to claim 1, wherein
   said parallax barrier part is configured such that transmission areas and light shielding areas are alternately formed in a horizontal direction,
   said first type pixels and said second type pixels in said liquid crystal display panel are alternately arranged in said horizontal direction, and
   said pixel end area includes a horizontal end area formed on at least one of one side and the other side in said horizontal direction of each of said plurality of pixel areas.

4. The liquid crystal display device according to claim 3, wherein said horizontal end area includes an area where light emitted to a front area including a viewing angle of 0° with respect to said display surface of said liquid crystal panel is transmitted.

5. The liquid crystal display device according to claim 3, wherein
said horizontal end area includes an area where light emitted to a reverse viewing area including maximum viewing angles in said first and second viewing angle ranges is transmitted.

6. The liquid crystal display device according to claim 1, wherein
said liquid crystal panel further includes a shielding pattern part that is provided between said liquid crystal layer and said parallax barrier part, and has a shielding area where light transmitted through said liquid crystal layer is selectively shielded, and
said shielding area of said shielding pattern part is formed on a whole of said pixel end area.

7. A liquid crystal display device comprising:
a liquid crystal display panel configured to perform image display on a display surface by a plurality of pixels, each of said plurality of pixels being configured to include a liquid crystal layer whose state is changed by voltages applied to first and second pixel electrodes, and said plurality of pixels having at least first type pixels and second type pixels which have respective separated roles; and
a parallax barrier part arranged on a side close to said display surface with respect to said liquid crystal layer, and configured to display a first display image by said first type pixels and a second display image by said second type pixels in first and second viewing angle ranges which are different from each other, wherein
in said pixel area, an area where said first pixel electrode is exposed in plan view is said pixel end area, and an area where said second pixel electrode is exposed in plan view is said pixel main area in said first and second pixel electrodes, and
said first and second pixel electrodes have a combination structure in which a corresponding pixel area is classified into a pixel end area and a pixel main area other than said pixel end area, and transmittance of said pixel end area is made relatively higher than transmittance of said pixel main area.

8. The liquid crystal display device according to claim 7, wherein
said first and second pixel electrodes apply first and second voltages to said liquid crystal layer that is interposed between a counter electrode and said first and second pixel electrodes, an area sandwiched between said first and second pixel electrodes and said counter electrode is said pixel area, and transmittance of said liquid crystal layer has negative correlation with said first and second voltages,
said first and second pixel electrodes are formed so as to partially overlap in plan view in a vertically-structured relation in which the second pixel electrode is located above the first pixel electrode, and
an insulating film is formed on said first pixel electrode and under said liquid crystal layer, so that said first voltage is made relatively lower than said second voltage by a capacitive component generated by said insulating film.

9. The liquid crystal display device according to claim 7, wherein
said parallax barrier part is configured such that transmission areas and light shielding areas are alternately formed in a horizontal direction,
said first type pixels and said second type pixels in said liquid crystal display panel are alternately arranged in said horizontal direction, and
said pixel end area includes a horizontal end area formed on at least one of one side and the other side in said horizontal direction of each of said plurality of pixel areas.

10. The liquid crystal display device according to claim 9, wherein
said horizontal end area includes an area where light emitted to a front area including a viewing angle of 0° with respect to said display surface of said liquid crystal panel is transmitted.

11. The liquid crystal display device according to claim 9, wherein
said horizontal end area includes an area where light emitted to a reverse viewing area including maximum viewing angles in said first and second viewing angle ranges is transmitted.

12. The liquid crystal display device according to claim 7, wherein
said liquid crystal panel further includes a shielding pattern part that is provided between said liquid crystal layer and said parallax barrier part, and has a shielding area where light transmitted through said liquid crystal layer is selectively shielded, and
said shielding area of said shielding pattern part is formed on a whole of said pixel end area.

13. A liquid crystal display device comprising:
a liquid crystal display panel configured to perform image display on a display surface by a plurality of pixels, each of said plurality of pixels being configured to include a liquid crystal layer whose state is changed by voltages applied to first and second pixel electrodes, and said plurality of pixels having at least first type pixels and second type pixels which have respective separated roles; and
a parallax barrier part arranged on a side close to said display surface with respect to said liquid crystal layer, and configured to display a first display image by said first type pixels and a second display image by said second type pixels in first and second viewing angle ranges which are different from each other, wherein
said first and second pixel electrodes have a combination structure in which a corresponding pixel area is classified into a pixel end area and a pixel main area other than said pixel end area, and transmittance of said pixel end area is made relatively higher than transmittance of said pixel main area,
said liquid crystal panel further includes a shielding pattern part that is provided between said liquid crystal layer and said parallax barrier part, and has a shielding area where light transmitted through said liquid crystal layer is selectively shielded, and
said shielding area of said shielding pattern part is formed on a whole of said pixel end area.

* * * * *